(12) United States Patent
Laracey

(10) Patent No.: US 9,305,295 B2
(45) Date of Patent: Apr. 5, 2016

(54) PAYMENT PROCESSING METHODS AND SYSTEMS

(71) Applicant: PAYPAL, INC., San Jose, CA (US)

(72) Inventor: Kevin Laracey, Natick, MA (US)

(73) Assignee: PAYPAL, INC., San Jose, CA (US)

( * ) Notice: Subject to any disclaimer, the term of this patent is extended or adjusted under 35 U.S.C. 154(b) by 342 days.

(21) Appl. No.: 13/768,156

(22) Filed: Feb. 15, 2013

(65) Prior Publication Data

US 2013/0246203 A1 Sep. 19, 2013

Related U.S. Application Data

(63) Continuation of application No. 12/846,911, filed on Jul. 30, 2010, now Pat. No. 8,380,177.

(60) Provisional application No. 61/322,477, filed on Apr. 9, 2010, provisional application No. 61/362,567, filed on Jul. 8, 2010.

(51) Int. Cl.
| | |
|---|---|
| *H04M 3/42* | (2006.01) |
| *G06Q 20/32* | (2012.01) |
| *G06Q 20/10* | (2012.01) |
| *G06Q 20/20* | (2012.01) |
| *G06Q 30/02* | (2012.01) |
| *G06Q 30/06* | (2012.01) |

(52) U.S. Cl.
CPC ............ *G06Q 20/322* (2013.01); *G06Q 20/108* (2013.01); *G06Q 20/20* (2013.01); *G06Q 20/3276* (2013.01); *G06Q 30/0253* (2013.01); *G06Q 30/06* (2013.01)

(58) Field of Classification Search
CPC . G06Q 20/322; G06Q 20/20; G06Q 20/3276; G06Q 30/06
USPC ......................................... 455/414.1; 370/338
See application file for complete search history.

(56) References Cited

U.S. PATENT DOCUMENTS

| | | |
|---|---|---|
| 5,739,512 A | 4/1998 | Tognazzini |
| 7,040,533 B1 | 5/2006 | Ramachandran |
| 7,379,921 B1 | 5/2008 | Kiliccote |
| 7,483,858 B2 | 1/2009 | Foran et al. |
| 7,992,776 B1 | 8/2011 | Ramachandran et al. |
| 2003/0004737 A1 | 1/2003 | Conquest et al. |
| 2003/0110717 A1 | 6/2003 | Rodriguez |

(Continued)

FOREIGN PATENT DOCUMENTS

| | | |
|---|---|---|
| EP | 1 264 259 B1 | 2/2007 |
| JP | 2002-032686 A | 1/2002 |

(Continued)

OTHER PUBLICATIONS

European Patent Office, "Communication: Extended European Search Report", Jun. 3, 2014, European Application No. 11766781.6-1955/2556477, International Application No. PCT/US2011/031696, 7pgs.

(Continued)

*Primary Examiner* — Marcos Batista
(74) *Attorney, Agent, or Firm* — Haynes and Boone, LLP

(57) ABSTRACT

Systems, methods and apparatus for conducting payment transactions are provided. Pursuant to some embodiments, the payment transactions may be conducted between a consumer operating a mobile device and a merchant.

30 Claims, 15 Drawing Sheets

(56) References Cited

U.S. PATENT DOCUMENTS

| | | | |
|---|---|---|---|
| 2003/0126064 A1* | 7/2003 | Foran et al. | 705/37 |
| 2005/0203854 A1 | 9/2005 | Das et al. | |
| 2006/0105742 A1 | 5/2006 | Kim et al. | |
| 2006/0206709 A1 | 9/2006 | Labrou et al. | |
| 2007/0295805 A1 | 12/2007 | Ramachandran | |
| 2008/0034221 A1 | 2/2008 | Hammad et al. | |
| 2008/0048022 A1 | 2/2008 | Vawter | |
| 2008/0222048 A1 | 9/2008 | Higgins et al. | |
| 2009/0063312 A1* | 3/2009 | Hurst | 705/30 |
| 2009/0192913 A1* | 7/2009 | Saito et al. | 705/26 |
| 2009/0254479 A1 | 10/2009 | Pharris | |
| 2010/0017327 A1 | 1/2010 | Treadwell et al. | |
| 2010/0125510 A1 | 5/2010 | Smith et al. | |
| 2011/0055084 A1 | 3/2011 | Singh | |
| 2011/0066550 A1 | 3/2011 | Shank et al. | |
| 2011/0238573 A1 | 9/2011 | Varadarajan | |
| 2011/0251892 A1 | 10/2011 | Laracey | |
| 2012/0187187 A1 | 7/2012 | Duff et al. | |
| 2013/0110654 A1 | 5/2013 | Kobres | |
| 2013/0110676 A1 | 5/2013 | Kobres | |
| 2013/0110727 A1 | 5/2013 | Kobres | |
| 2013/0110728 A1 | 5/2013 | Kobres | |
| 2013/0124411 A1 | 5/2013 | Kobres et al. | |
| 2013/0132234 A1 | 5/2013 | Grossi et al. | |

FOREIGN PATENT DOCUMENTS

| | | |
|---|---|---|
| JP | 2003-141402 A | 5/2003 |
| JP | 2004-246536 A | 9/2004 |
| JP | 2004-326348 A | 11/2004 |
| JP | 2005-157426 A | 6/2005 |
| JP | 2006-099713 A | 4/2006 |
| JP | 2006-243842 A | 9/2006 |
| JP | 2006-277715 A | 10/2006 |
| JP | 2007-034941 A | 2/2007 |
| JP | 2008-129787 A | 6/2008 |
| JP | 2008-217277 A | 9/2008 |
| JP | 2008-242828 A | 10/2008 |
| JP | 2009-080729 A | 4/2009 |
| JP | 2009-276838 A | 11/2009 |
| KR | 2006-0084520 A | 7/2006 |
| KR | 1020100018744 A | 2/2010 |
| KR | 20110039946 A | 4/2011 |
| WO | 01/63546 A1 | 8/2001 |
| WO | 2008-153096 A1 | 12/2008 |
| WO | 2010035224 A2 | 4/2010 |
| WO | 2010125577 A1 | 11/2010 |

OTHER PUBLICATIONS

European Patent Office, "Communication: Extended European Search Report", Jun. 3, 2014, European Application No. 11851732.5-1958/2656292, International Application No. PCT/US2011/067197, 6pgs.

"PCT Notification of Transmittal of the International Search Report and the Written Opinion of the International Searching Authority, or the Declaration", dated Dec. 7, 2011, for International Application No. PCT/US2011/031696, 11pgs.

"Notification of Transmittal of the International Search Report and the Written Opinion of the International Searching Authority or the Declaration", dated Aug. 14, 2012, for PCT Application No. PCT/US2011/067197, 16pgs.

"PCT Notification of Transmittal of the International Search Report and the Written Opinion of the International Searching Authority, or the Declaration", dated Sep. 13, 2013, for International Application No. PCT/US2013/042714, 10pgs.

"Japanese Office Action", dated Dec. 9, 2013, for Japanese Application No. 2013-503978, 8pgs.

Laracey, Kevin "Japanese Office Action", dated Jul. 29, 2014, for Japanese Patent Application No. 2013-546454 entitled: Mobile Phone ATM Processing Methods and Systems, 5pgs.

Laracey, Kevin "English-language Translation of Japanese Office Action", dated Jul. 29, 2014, for Japanese Patent Application No. 2013-546454, entitled: Mobile Phone ATM Processing Methods and Systems, 6pgs.

"PCT Notification of Transmittal of the International Search Report and the Written Opinion of the International Searching Authority, or the Declaration", dated Sep. 13, 2013, for International Application No. PCT/US2013/040953, 13pgs.

"European Communication pursuant to Rule 114(2) EPC", European Patent Office, Oct. 30, 2013, European Application No. 11766781.6-1955/2556477, International Application No. PCT/US2011/031696, 8pgs.

News Releases in 2006, "Bill Paying by Mobile Phone Using Barcode Capture", Nov. 8, 2006, NTT Data Corporation, 4pgs.

"Examiner's Report" dated Dec. 1, 2014, Canadian Intellectual Property Office, for Canadian Patent Application No. 2,795,766 entitled: Mobile Phone Payment Processing Methods and Systems, 4 pages.

"Notification Concerning Transmittal of International Preliminary Report on Patentability, Chapter I of the Patent Cooperation Treaty", Nov. 27, 2014, for International Application No. PCT/US2013/040953, 10 pgs.

* cited by examiner

| USER ID 1002 | NAME 1004 | DEVICE ID 1006 | PREFERENCE(S) 1008 | ACCOUNT(S) 1010 | ACCOUNT-LEVEL RULE(S) 1012 |
|---|---|---|---|---|---|
| UI0001 | JANE DOE | DID12345, (202)555-5555 | 1. REDUCE CREDIT USAGE, 2. REDUCE FEES | CHASE CREDIT CARD, PAN ######, 05/12 | PRIORITY = 4 |
| | | | | WEBSTER BANK CHECKING, ABA: ######, ACCT: ####### | PRIORITY = 2, MIN BAL = $1,000 |
| | | | | WEBSTER BANK, VISA DEBIT: PAN ######, 06/11 | PRIORITY = 3, MIN BAL = $1,000 |
| | | | | STARBUCKS GIFT, PAN ######, 08/10 | PRIORITY = 1 |
| UI0002 | SAM JONES | DID12222 | 1. EARN REWARDS 2. SEPARATE BUSINESS EXPENSES | UNITED AIR VISA CARD, PAN ######, 09/12 | PRIORITY = 1 |
| | | | | SEARS PLCC, PAN #####, 10/11 | PRIORITY = 1 |
| | | | | CITIBANK CHECKING, ABA ####, ACCT: #### | PRIORITY = 2 |
| | | | | AMEX, PAN #####, 11/11 | PRIORITY = 1 |

FIG. 9

ND SYSTEMS

PAYMENT PROCESSING METHODS AND SYSTEMS

CROSS REFERENCE TO RELATED APPLICATIONS

The present application is based on, and claims benefit and priority of, U.S. patent application Ser. No. 12/846,911 (filed on Jul. 30, 2010), U.S. Provisional Patent Application Ser. Nos. 61/322,477 (filed on Apr. 9, 2010), and 61/362,567 (filed on Jul. 8, 2010) the contents of each of which are incorporated herein in their entirety for all purposes.

BACKGROUND

Credit cards, debit cards and other payment cards have been in use for years. The manner in which these payment cards are used is substantially unchanged since their introduction—a cardholder presents their payment card to a merchant, who uses a magnetic stripe reader to read the cardholder's payment account information, and then the merchant transmits the payment account information along with transaction details to a payment network for authorization, clearing and settlement. While this approach has worked well, there are a number of disadvantages associated with it.

For example, not all merchants are able to properly secure the user information that is read from a payment card. There have been a number of highly publicized incidents where cardholder data was stolen from merchant systems. In other incidents, employees directly skimmed or copied cardholder data and used it for fraudulent transactions. If merchants are required to continue to read, store and transmit payment card information, such thefts will persist. Further, the systems and procedures required to properly save, store and transmit cardholder information is a significant cost to merchants. It would be desirable to provide systems and methods in which payment card information is not stored, captured, or transmitted by merchants.

As another example disadvantage, current payment cards are typically associated with a single payment account. A cardholder may have a number of payment cards, but must make a conscious decision regarding which one (or ones, in the case of a split tender transaction) of those payment cards to use in a given transaction. It would be desirable to provide systems and methods which allow a customer to select one or more payment accounts for use in conducting a transaction. Further, it would be desirable to provide a customer with information about which account(s) should be used in a given transaction (e.g., in order to save on transaction costs, to earn rewards, to manage balances and spend, etc.).

Another disadvantage of existing payment systems is that current payment cards are unable to easily be used in conjunction with mobile devices such as smart phones. Some payment card associations and issuers have proposed the use of RFID chips or tags installed on mobile phones as a way to allow payment card information to be presented at a point of sale location. However, such solutions require that point of sale devices have RFID readers installed. The installation of such devices is expensive and time consuming. It would be desirable to provide an ability to conduct purchase transactions (both online and at brick and mortar stores) using a mobile device.

These, and other, problems are solved by using systems and methods of the present invention. Other advantages and features will become apparent upon reading the following disclosure.

BRIEF DESCRIPTION OF THE DRAWINGS

FIG. 9 is a table depicting a portion of a customer database pursuant to some embodiments.

DESCRIPTION

Figure 1:
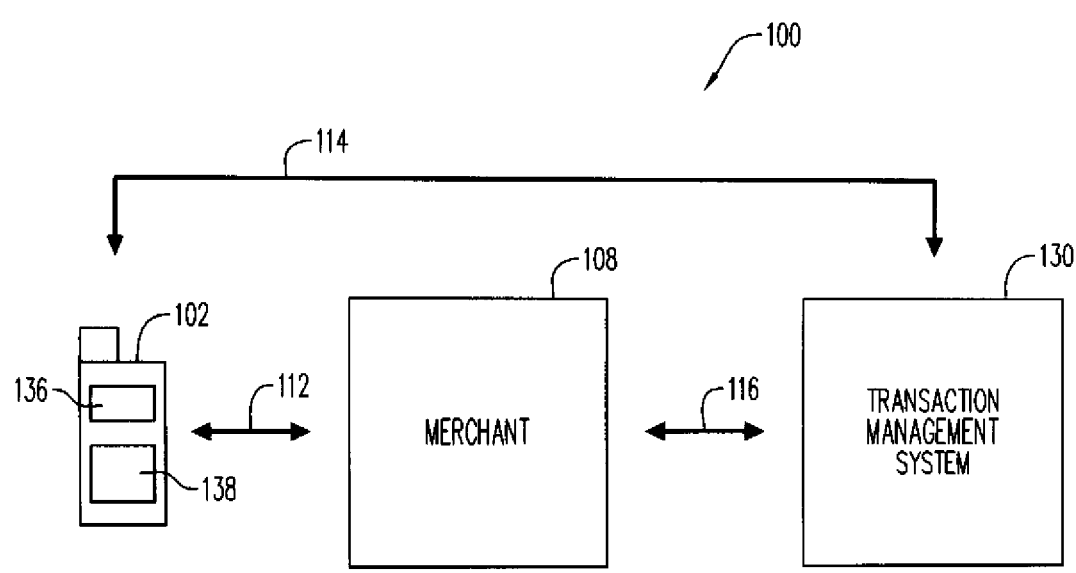
FIG. 1 is a block diagram depicting a payment system configured pursuant to some embodiments.

Embodiments of the present invention relate to systems, methods, processes, computer program code, and means for using mobile devices to conduct payment transactions at merchant locations including brick and mortar locations and remote (e.g., such as Internet or mail order and telephone) locations, as well as for person to person transactions. In some embodiments, the mobile device can be used to initiate and conduct payment transactions involving a number of different payment accounts, including, for example, credit, debit, deposit, stored value, checking and other accounts. In some embodiments, a mobile device configured using features of the present invention may be capable of initiating payment transactions that are processed over a variety of different payment networks (e.g., such as the credit card networks operated by Visa, Inc. or MasterCard International Incorporated, private label processing networks, electronic funds transfer networks, Automated Clearing House networks, or the like). In some embodiments, mobile devices configured using features of the present invention are capable of determining or suggesting a most desirable payment account to use in a given transaction (e.g., based on one or more predefined user-specified rules, account characteristics, merchant information or the like). In this manner, users are provided with greater payment options and better information about which payment account to use in any given transaction.

Pursuant to some embodiments, transaction methods, systems, apparatus, means and computer program code are provided for conducting payment transactions which include selecting a mobile payment option at a point of sale, obtaining, using a mobile device, a checkout token printed or otherwise displayed at the point of sale, selecting, using said mobile device, a payment account, viewing, on the mobile device, payment transaction details associated with a pending payment transaction, and authorizing, using the mobile device, the payment transaction. Pursuant to some embodiments, the checkout token is obtained by the mobile device by capturing a barcode image, key entering the checkout token, by wireless communication or otherwise receiving the checkout token at a mobile device.

Embodiments of the present invention are believed to provide desirable advantages from a fraud reduction standpoint, as the chance for fraud is low, and PCI compliance is made very easy for the merchant for a variety of reasons, including: (i) the customer's actual payment credentials are never provided to a merchant, and (ii) the customer's payment credentials can never be accessed for use in a payment transaction unless the access request is coming from one of the authorized devices that has been designated by the customer as having access to the customer's payment credentials.

A number of terms are used herein for convenience and ease of exposition. For example, the term "capture" will be used to refer to the act of scanning, reading or other capturing of a "checkout token" (an identifier used to facilitate transactions pursuant to some embodiments). The term "capturing" (or "captured") is not intended to be limiting, and is intended to encompass embodiments where a mobile device is operated to receive a checkout token (or data associated with a checkout token) via key entry, via image capture, via RFID reading, and using other scanning, reading, or other techniques described herein. Pursuant to some embodiments, the term "capture" further includes any decoding or image processing of a checkout token required to retrieve or otherwise obtain information from the checkout token.

As another example, the term "wireless" is used to refer to unwired remote communication techniques, such as, for example, using radio frequency or other electromagnetic radiation based communication techniques (including RFID, wifi, Bluetooth, zigbee or other techniques). Those skilled in the art, upon reading this disclosure, will appreciate that the use of these terms is not intended to be limiting, but for the purposes of exposition.

INTRODUCTION

Illustrative Examples

Embodiments of the present invention allow customers to make purchases at merchant locations using their mobile devices. In the following, a number of processes and transaction flows will be described. To help in describing those processes and transaction flows, two illustrative example users will now be introduced. The examples will be used to illustrate features of some embodiments and to aid in describing certain features of the present invention. The examples are not intended to be limiting and are merely provided for illustration.

A first example user is referred to herein as "Jane". In the example, Jane has four payment accounts that she uses on a regular basis: (i) a high interest rate credit card, (ii) a checking account, (iii) a debit card linked to her checking account, and (iv) a Starbucks® gift card. Jane only likes to use her credit card when she has to, and always wants to make sure that she keeps at least $1,000 in her checking account. Jane also prefers, when possible, to reduce the amount of fees she has to pay for any transaction.

A second example user is referred to herein as "Sam". In the example, Sam has five payment accounts that he uses regularly: (i) a rewards credit card, (ii) a private label Sears® credit card, (iii) a checking account, and (iv) an American Express® charge card that Sam uses for work-related expenses. Sam prefers to earn rewards when possible, which he earns with his rewards credit card and his Sears private label card (when shopping at Sears), and to put any business-related expenses on his American Express charge card.

Both Sam and Jane have mobile phones. Sam has a mobile phone that has a Web browser, and Jane has an Apple iPhone®. Sam will access and use the payment system of the present invention using his phone's browser, while Jane will access and use the payment system of the present invention by downloading and configuring an iPhone® application (or "app") configured to facilitate payment transactions pursuant to the present invention.

Figure 2:
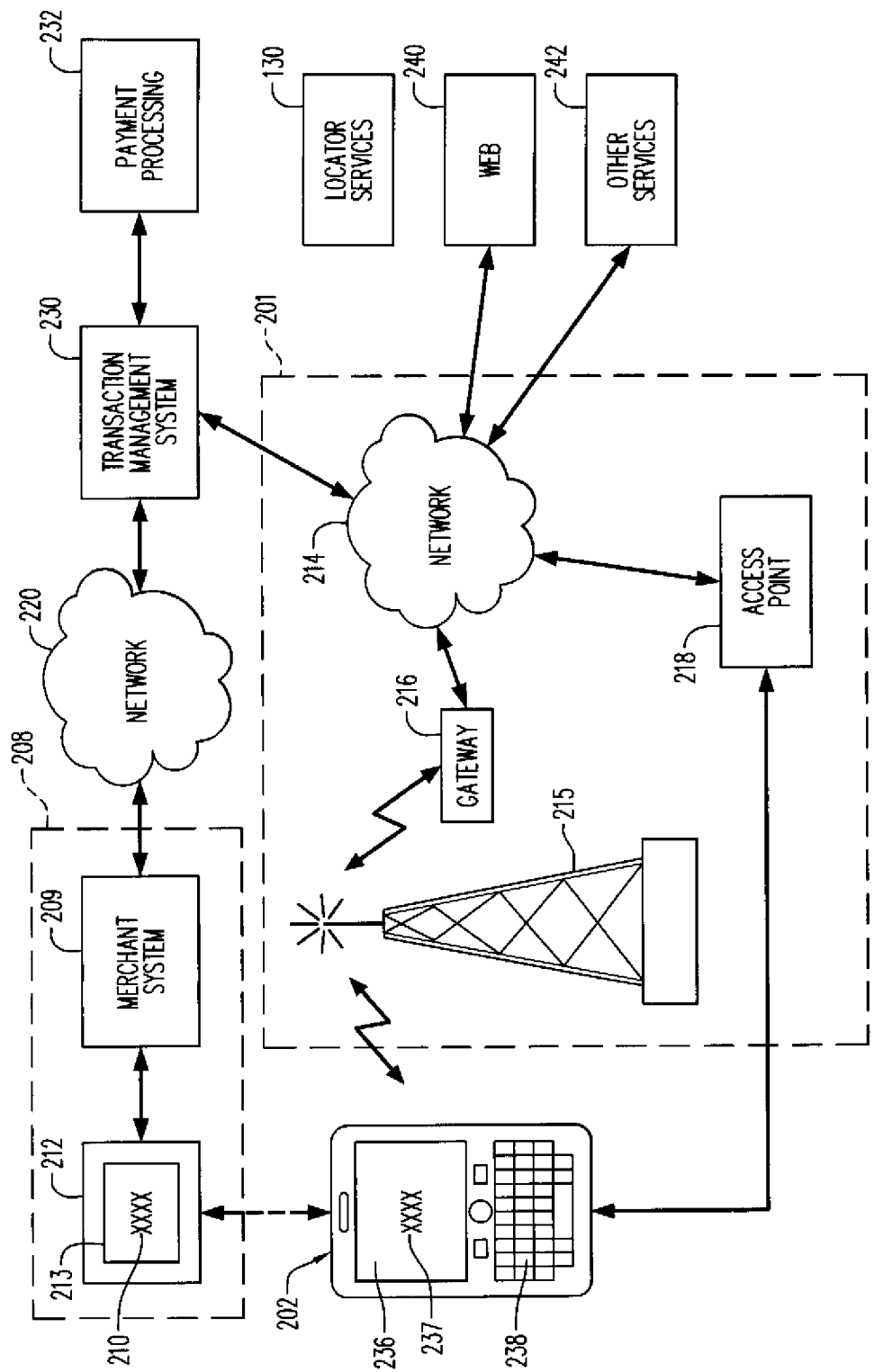
FIG. 2 is a block diagram depicting further details of a payment system configured pursuant to some embodiments.
Figure 3:
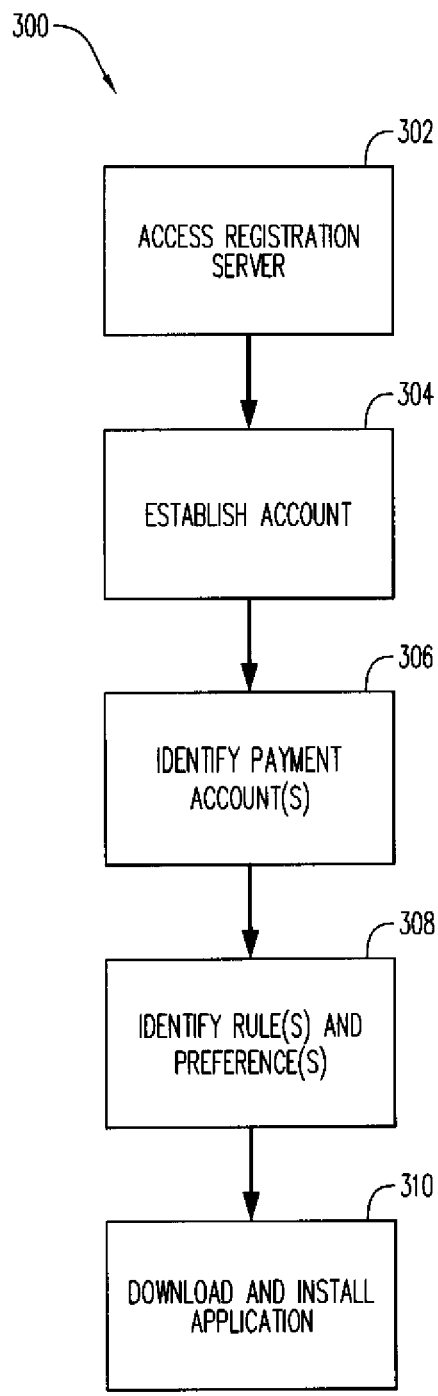
FIG. 3 is a flow diagram depicting a customer registration process pursuant to some embodiments.

Using features of the present invention, customers such as Jane and Sam may use their mobile devices to pay for products or services at point of sale (or "POS") locations. Merchants need not modify their point of sale hardware (although some embodiments involve the merchant displaying a checkout token on a point of sale display terminal) and users may pay using their existing payment accounts. Embodiments allow users to choose among a variety of payment accounts to use the most appropriate or most desirable payment account for a given transaction. Embodiments also allow merchants, payment account issuers, and/or payment network operators to establish rules governing which payment instruments are made available for use on the phone. These illustrative examples will be used in conjunction with some of the following description to aid in describing features of some embodiments of the invention. In FIG. 1, an overview of a system according to the present invention will be described. In FIG. 2, a more detailed block diagram of some components of a system is provided. In FIG. 3, a customer registration process will be described, and in FIGS. 4A-C transaction processes will be described.

System Overview

Features of some embodiments of the present invention will now be described by reference to FIG. 1, which is a block diagram of a system 100 pursuant to some embodiments. As shown, a payment account holder, buyer, or other user or operator (hereafter, the "customer") may have or use a mobile device 102 (such as a mobile telephone or the like). The mobile device 102 has a display screen 136 and a data entry device 138 (such as a keypad or touch screen). Pursuant to embodiments of the present invention, the customer may use the mobile device 102 to conduct a purchase transaction with a merchant 108. The merchant 108 may be a physical storefront, electronic commerce merchant, or mail order and telephone ("MOTO") merchant (or another person or entity).

In a typical example transaction, a customer may purchase products or services from the merchant 108 by first taking the products or services to a point of sale (e.g., such as a physical checkout counter, an electronic shopping cart, or the like, generally referred to herein as the "point of sale" or "POS"). The merchant 108 begins the checkout transaction as normal, by totaling the items to be purchased (e.g., by using a bar code scanner, key entry of product codes, or the like). The merchant (acting through a clerk, a display screen, a POS terminal facing the customer, or the like) then prompts the customer to select a payment option. In prior systems, the merchant might prompt the customer to select "credit", "debit" or another payment option. Pursuant to the present invention, the merchant (acting through a clerk, display screen, a POS terminal facing the customer, or the like) may prompt the customer for those options as well as a mobile payment option. If the customer selects the mobile payment option, features of the present invention are utilized to process the transaction.

In some embodiments, rather than requiring the customer to select the mobile payment option by an action (such as by pushing a button on a POS terminal or communicating the choice to a clerk, etc.), the choice may be made by the customer's act of scanning, capturing or entering a checkout identifier (as discussed below). For example, in such embodiments, the action of capturing the checkout identifier used in the present invention will cause the transaction to proceed pursuant to the present invention.

If the mobile payment option is selected, and once the purchase total has been generated, the merchant 108 transmits a merchant payment authorization request message to a transaction management system 130 (via path 116). The merchant payment authorization request message may include one or more pieces of data or information about the transaction. For example, the message may include one or more of a merchant identifier, the amount due, and a unique checkout token ("checkout token") which, as will be described further herein, is used to identify the merchant and the transaction for further processing.

A number of techniques may be used to generate or present the checkout token. For example, in some embodiments, one or more checkout tokens may be predefined or established for use with a given merchant 108 (e.g., the merchant 108 could have a number of checkout tokens available to display or present at the point of sale). In such embodiments, the merchant 108 would choose a checkout token for use with a given transaction. In some embodiments, such checkout tokens may be generated or provided using a standardized format. As an illustrative example, a merchant 108 may be issued or provided with a range of checkout tokens or a predefined series or sequencing of numbers. As a specific example, a merchant may be instructed to use a range of numbers (e.g., from "00000" to "99999") as well as a sequencing or usage pattern (e.g., a specific checkout token may only be used in conjunction with a single active transaction). In such an embodiment, the POS system would pass a selected checkout token to the transaction management system 130. In other embodiments, however, the checkout tokens are issued or selected by the transaction management system 130 and are provided to the merchant 108 in response to a merchant authorization request message (as will be described further below). Those skilled in the art will recognize that other techniques for issuing, using and selecting checkout tokens may be used.

Pursuant to some embodiments, the checkout token is dynamically generated for each transaction. In some embodiments, the checkout token is a static identifier associated with an individual checkout location (e.g., such as a specific point of sale terminal or location, or with a small business person such as a plumber or electrician who has no specific checkout location, or with an individual). The merchant 108 causes the checkout token to be displayed or presented to the customer. For example, the checkout token may be displayed on a display device associated with the merchant, or pre-printed on a placard or other display near the point of sale.

From the customer perspective, the payment process of the present invention may begin with the customer performing an authentication process to confirm their identity and authority to conduct transactions using the present invention. The authentication process may be performed after, or in some situations, prior to the customer's selection of the mobile payment option at the point of sale. Pursuant to some embodiments, the authentication process serves to authenticate the customer to the transaction management system 130. The authentication process may involve the customer launching a mobile payment application or a Web browser on the mobile device 102 and providing one or more credentials or items of information to the transaction management system 130 via communication path 114. For example, the authentication process may involve the entry of a user identifier, a password, or other credentials into a login screen or other user interface displayed on a display device 136 of the mobile device 102. The transaction management system 130 compares the received information with stored information to authenticate the customer.

The authentication process, in some embodiments, also involves the comparison of one or more attributes of the mobile device 102 with a stored set of attributes collected from the mobile device 102 during a registration process (such as the process of FIG. 3). For example, the attributes may include identifiers associated with the mobile device 102 which uniquely identify the device. In this way, the customer is authenticated two ways—with something they know (login credentials), and something they have (mobile device). Once the customer is successfully authenticated, then the system has access to a variety of attributes about the customer, including a list of payment accounts that the customer previously identified to the transaction management system 130 as part of the registration process.

After a successful authentication process, the customer is prompted to scan, capture (or otherwise enter) a checkout token from a device associated with the merchant 108 (shown as interaction 112 between the mobile device 102 and the merchant 108). The checkout token is used, as will be described further herein, to link messages from the mobile device 102 and the merchant 108, and the transaction management system 130, so that transactions pursuant to the present invention may be accomplished. After capture of the checkout token, the mobile device 102 transmits the token to the transaction management system 130 in a customer transaction lookup request message (over communication path 114). The customer transaction lookup request message includes the checkout token captured by the mobile device 102.

Pursuant to some embodiments, either a "static" checkout token or a "dynamic" checkout token may be used. In an embodiment where a "static" checkout token is used (e.g., such as one that is assigned for use by a specific checkout location and which does not include any variable information for each transaction), the transaction management system 130 matches the information in the customer transaction lookup request (received from the mobile device 102) with the information in the merchant payment authorization request (received from the merchant 108) by matching the checkout token information received in each of the messages. Once a match is found, the transaction management system 130 transmits a transaction detail message (via path 114) to the customer's mobile device 102. The information from the transaction detail message provides the customer with details about the transaction, including but not limited to the amount due, the name and location of the merchant (information contained in or derived from the merchant payment authorization request), and possibly one or more marketing messages. In addition, the transaction management system may also send to the phone a list of payment accounts the customer has registered with the system, including credit, debit, checking, prepaid and other types of accounts. The list of accounts may include all of the accounts the customer registered with the system, or it may include a subset of accounts, based on rules established by the mobile payment network operator, the merchant, the issuer of each payment account, the customer, or another entity (e.g., the list of accounts sent to the mobile device may only include those accounts that may be used for the current transaction). Now the customer can see on the display 136 of their mobile device 102 the name of the merchant they are about to pay, the amount to be paid, and a list of their payment accounts they can use to pay the merchant 108.

In some embodiments, the merchant's checkout token may be derived from a unique identifier in the merchant payment authorization request. For example, in cases where the merchant can't easily modify their system to pass the transaction management system 130 a static checkout token, such a derivation may reduce or even eliminate the need for equipment upgrades and software changes that might otherwise be required by a merchant adopting a new payment method. The checkout token may be derived using a mapping table which maps a merchant identifier, a terminal identifier, or other information (passed by the merchant system to the transaction management system 130) to a checkout token. Based on the received identifier, a mapping process may occur to identify the appropriate checkout token for use in that payment transaction. The selected checkout token is associated with the transaction in the merchant transaction queue where it is made available to be matched with transactions from the customer message queue. Those skilled in the art will recognize that other matching and mapping techniques may also be used. In either event, the checkout token is an identifier (consisting of a combination of letters, numbers, and/or symbols) used to link a merchant payment authorization request to a payment authorization request received from a customer operating a mobile device pursuant to the present invention.

In embodiments using a "dynamic" checkout token (e.g., where the checkout token is generated by either the merchant 108 or the transaction management system 130 before it is displayed on a display device associated with the merchant during a checkout transaction, and where the checkout token may include additional information about a transaction), checkout processing may proceed without a need for a customer transaction lookup request message to be transmitted to the transaction management system 130. For example, in some embodiments, some or all of the transaction details may be encoded in a dynamic checkout token which, when captured and processed by the mobile device 102, provides the transaction details to the mobile device 102. Further details of both "static" and "dynamic" checkout token embodiments will be discussed further below. In either event, however, the checkout token is used to match messages from the mobile device 102 with messages from the merchant 108 at the transaction management system 130.

To complete the payment transaction, the customer then interacts with the mobile device 102 to select a desired payment account to use in the present transaction, and causes a customer payment authorization request message to be submitted (via path 114) to the transaction management system 130. In some embodiments, the transaction management system 130 transmits a payment authorization request message to the customer's mobile device, enabling the customer to have a final opportunity to confirm or cancel the payment transaction, although this step is optional. The customer's confirmation or cancellation is transmitted from the mobile device 102 as a customer payment authorization message to the transaction management system 130 via path 114.

Once the payment authorization message from the customer's mobile device is received, the transaction management system 130 creates an authorization approval request message for transmission through one or more payment processing networks (not shown in FIG. 1) to cause the authorization, clearing and settlement of funds for the transaction. This request message includes information from the merchant payment authorization request such as the amount of the transaction, or at least a pointer or reference to the relevant merchant payment authorization request (received from the merchant 108) and a payment account identifier identifying the payment account selected by the customer and previously stored in the transaction management system 130. The authorization approval processing is performed using standard financial authorization processing over one or more authorization networks (e.g., such as the VISANET® network operated by Visa, Inc., an Automated Clearing House system such as NACHA, or the like). Once the availability of funds is confirmed, the transaction management system then sends the merchant payment authorization response message (via path 116) to the merchant so the transaction can be completed at the point of sale. A customer payment authorization response message may also be displayed to the customer at the point of sale and/or transmitted to the customer's mobile device.

Pursuant to some embodiments, as will be described further below, the merchant 108 is not provided with any actual payment credentials of the customer during the checkout process. Further, the mobile device 102 never stores, sends or receives actual payment credentials. Instead, the mobile device 102 stores or has access to a proxy associated with actual payment credentials, and the proxy is used to identify a desired payment account for use in a given transaction. The proxy is transmitted to the transaction management system 130 in a customer payment authorization request message and the transaction management system 130 uses the proxy to lookup or identify the actual payment credentials associated with the selected account. The actual payment credentials are then transmitted from the transaction management system 130 to an account issuer or agent for authorization. By ensuring that actual payment credentials are not revealed to or stored at a merchant 108 or mobile device 102, embodiments provide increased account security and reduced potential for fraud or abuse.

Pursuant to some embodiments, the mobile device 102 may be a smart phone or a Web enabled mobile device such as, for example, an iPhone®, an Android® phone, or any phone that can access and display Web content or access the Internet. In some embodiments, the mobile device 102 communicates with transaction management system 130 using a cellular or wireless network. In some embodiments, the transaction management system 130 is a secure server (or network of servers). In some embodiments, the transaction management system 130 is in communication with one or more payment processing networks (not shown in FIG. 1) such as the VISANET® network operated by Visa Inc., the BANK-NET® network operated by MasterCard International, or the like. The transaction management system 130 may also be in communication with other financial transaction networks (such as ACH and EFT networks, private label networks, alternative payment systems such as PayPal®, or the like) to allow customers operating mobile devices 102 to conduct transactions using a wide variety of different forms of payment instruments and accounts. The transaction management system 130 may further be in communication with one or more ad or offer management networks, such as those provided by Google®, Apple®, Yahoo®, Microsoft® or the like. As will be described further below, data, including advertisements and offers may be received from those networks and presented to customers via the mobile device 102.

Although the system depicted in FIG. 1 (and elsewhere throughout this disclosure) shows only a single mobile device 102, merchant 108 and transaction management system 130, those skilled in the art will appreciate that in use there will be a number of devices in use, a number of merchants using the system, and potentially multiple instances of the transaction management system in operation.

As will be described further below, transactions conducted using embodiments of the present invention have a number of desirable advantages over existing payment methods. For example, customers are able to conduct payment transactions at a wide variety of merchant locations using their mobile device. Further, the mobile device may be used to access a variety of different payment accounts held by the customer, allowing the customer to select the most appropriate or desirable payment account for each transaction. Using features of the present invention, merchants need not undertake costly hardware retrofit or replacements, as embodiments may utilize existing point of sale systems and hardware. In addition, paying with embodiments of the present invention can be more secure than existing payment methods, as it is possible to require that each transaction be authenticated using two items—user information (such as a user identifier and/or password, or a PIN) known to the customer, as well as unique attributes associated with the mobile device the customer uses to initiate the transaction. Other benefits and advantages will become apparent to those skilled in the art upon reading this disclosure.

Further System Details

Further details of some aspects of a system according to some embodiments of the present invention will now be described by reference to FIG. 2. FIG. 2 is a block diagram of an example payment system network environment showing communication paths between a mobile device 202, merchants 208, transaction management system 230 and payment processing systems 232. Mobile device 202 may be, for example, a mobile telephone, PDA, personal computer, or the like. For example, mobile device 202 may be an iPhone® from Apple, Inc., a BlackBerry® from RIM, a mobile phone using the Google Android® operating system, or the like. Pursuant to some embodiments, mobile device 202 may operate a payment application allowing mobile device 202 to operate as a payment device as described herein. In some embodiments, mobile device 202 is capable of accessing and displaying Web content or otherwise accessing the Internet so that a customer operating mobile device 202 may interact with transaction management system 230 to initiate a transaction via a Web interface.

Mobile device 202 of FIG. 2 can, for example, communicate over one or more wired and/or wireless networks 201. As an example, a wireless network can be a cellular network (represented by a cell transmitter 215). A mobile device 202 may communicate over a cellular or other wireless network and through a gateway 216 and then communicate with a network 214 (e.g., such as the Internet or other public or private network). An access point, such as access point 218 may be provided to facilitate data and other communication access to network 214. Access point 218 may be, for example, compliant with the 802.11g (or other) communication standards. For example, in embodiments in which a mobile device 202 is operating a payment application which allows mobile device 202 to function as a payment device pursuant to the invention, the payment application may cause or control communication of data through network 201 to transaction management system 230.

In some embodiments, mobile device 202 may engage in both voice and data communications over wireless network 214 via access point 218. For example, mobile device 202 may be able to place or receive phone calls, send and receive emails, send and receive short message service ("SMS") messages, send and receive email messages, access electronic documents, send and receive streaming media, or the like, over the wireless network through access point 218. Similar communications may be made via network 215.

In some embodiments, a mobile device 202 may also establish communication by other means, such as, for example, wired connections with networks, peer-to-peer communication with other devices (e.g., using Bluetooth networking or the like), etc. Mobile device 202 can, for example, communicate with one or more services over networks 201, such as the transaction management system 230 (to conduct payment transactions, to create, edit, view or otherwise modify payment account settings and preferences, etc.), the Web 240, and other services 242. Mobile device 202 can also access other data over the one or more wired and/or wireless networks 201. For example, content providers, such as news sites, RSS feeds, web sites, blogs, social networking sites, developer networks, etc., can be accessed by mobile device 202. Such access can be provided by invocation of a web browsing function or application (e.g., a browser) in response to a customer launching a Web browser application installed on mobile device 202. In some embodiments, a user may utilize a Web browser to interact with transaction management system 230 to register payment accounts, establish account preferences, perform payment transactions, etc.

Mobile device 202 has a display screen 236 and a data entry device 238 (such as a keypad or touch screen, or voice interface). Pursuant to embodiments of the present invention, the customer may use the mobile device 202 to conduct a purchase transaction with a merchant 208. Merchant 208 may be a physical storefront, electronic commerce merchant, or MOTO merchant (or another person or entity). Mobile device 202, in some embodiments, also has a camera (not shown) or other image capture device which allows the mobile device 202 to capture an image or representation of a checkout token 210. Mobile device 202, in some embodiments, also has a wireless receiver (not shown) or other wireless signal receiving device which allows the mobile device 202 to capture a wireless signal representation of a checkout token 210. For example, a customer may operate mobile device 202 to take a digital picture or capture the image of a checkout token 210 displayed on or at a merchant point of sale device to initiate a payment transaction using the present invention. The captured image is shown as item 237 on the display screen 236. As will be described further below, the checkout token 210 may be used to initiate and conduct transactions with a merchant.

Merchant 208 may operate one or more merchant systems 209 to process payments and transactions, including, as will be described, payment transactions pursuant to the present invention (as well as "traditional" or standard payment transactions involving cash, standard payment cards, or the like). Merchant system 209 may be a networked point of sale system (such as for a physical retail location) or it may be a shopping cart system (such as for an electronic commerce or Internet retail location). Merchant system 209 may further be a combination of systems designed to allow a merchant to accept payments for goods or services. In some embodiments, merchant system 209 may be in communication with one or more point of sale devices 212 which have display devices 213 for presenting and receiving information from customers. For example, in the situation where the merchant 208 is a physical retail location, a merchant system 209 may be in communication with a number of different point of sale devices 212 each of which is located at a different checkout lane or location within the store (or in different stores in different geographical locations). Each of the point of sale devices 212 may present, display, or communicate transaction information to customers at the point of sale (or "POS") so that the customer can approve or authorize purchases and present payment for the purchases.

As another example, where the merchant 208 is an Internet or other electronic commerce merchant, the merchant system 209 may be a Web server (or a network of servers, some of which may be Internet accessible) configured to process purchase transactions associated with merchant 208. Point of sale devices 212, in such an example, may be a number of remote terminals interacting with merchant system 209 such as, for example, personal computers, mobile devices, or the like that are able to interact with the merchant system 209 via a network such as the Internet. Because embodiments of the present invention are capable of initiating and conducting transactions for both physical and remote types of merchants, the point of sale, point of purchase, or interaction between a buyer and merchant may be referred to as the "point of sale" herein.

Pursuant to embodiments of the present invention, a checkout token 210 is displayed on or near the point of sale. The checkout token 210 may be either a "static" checkout token or a "dynamic" checkout token. In situations where static checkout tokens are used, the token may be printed, displayed, or provided near the point of sale location (such as on a sticker or placard displayed so the customer can easily see and read or capture the token). Static checkout tokens 210 may be printed as a bar code image, as an alphanumeric identifier, or in other forms. In general, checkout tokens may be presented in forms which are easily discernable by a human so that they may be both key-entered or captured using a mobile device 202. In embodiments where static checkout tokens are used, an additional processing step may be performed (as will be described further below) in order to provide the mobile device 202 with detailed information about the transaction.

In embodiments where dynamic checkout tokens are used, the token may be displayed on a display device 213 associated with a point of sale device 212. A dynamic checkout token may be generated to include transaction information (e.g., such as the purchase amount, etc.) and may, in some embodiments, involve fewer messages between the mobile device 202 and the transaction management system 230 during a payment transaction. The checkout token 210 may be encoded or displayed as a bar code image, as an alphanumeric identifier, as a wireless signal, or in other forms to allow the checkout token 210 to be captured as an image (e.g., using a camera or scanner associated with the mobile device 202). The checkout token 210 may also be key entered by a customer of the mobile device 202 or be captured by a wireless receiver associated with the mobile device 202. In some embodiments, a mobile device may be operated in conjunction with multiple types of checkout tokens 210 (e.g., a mobile application may be capable of capturing a checkout token 210 using image capture, wireless receiving, or key entry, depending on how the checkout token 210 is presented at a point of sale).

The display device 213 could be an LCD (or other display technologies) display (e.g., such as those currently available at many merchants in systems such as the Hypercom 4150 terminal, or the Verifone MX870 terminal or the like). The use of the checkout token 210 in transactions pursuant to the present invention will be described further below. In general, however, the checkout token 210 is used by the transaction management system 230 to match a payment request from a mobile device 202 with a payment authorization request from the merchant 208 to complete a payment transaction using information stored at, or accessible to, the transaction management system 230. In embodiments where the checkout token 210 is a dynamic checkout token, the token may further be used to communicate transaction details from the merchant 208 to the mobile device 202.

In a typical example transaction, a customer may purchase products or services from the merchant 208 by first selecting mobile payment as a payment option, performing an authentication process with a payment application on a mobile device 202 (or via a Web browser interacting with transaction management system 230), capturing a checkout token 210 from a device associated with the merchant 208 (such as from a display 213 of a point of sale device 212), receiving transaction details and a payment account list or list of preferred or eligible accounts from the transaction management system 230, selecting a payment option on the mobile device 202, and submitting a customer payment authorization request to a transaction management system 230 over a network 201.

The selection of a payment option involves receiving information identifying one or more payment accounts available to the customer. The available payment accounts may be those specified by the customer during a registration process such as the process described further below in conjunction with FIG. 3. Pursuant to some embodiments, the presentation of the different payment account options may include applying one or more rules or preferences to a list of available payment accounts so that the customer is presented with the account(s) that are best suited or available for the current transaction. The customer selects the payment account (or accounts, in the case of a split tender transaction) to use and the information is transmitted to the transaction management system 230. In some embodiments, all of the customer's available payment accounts may be displayed to the customer after the customer has been authenticated.

In some embodiments, the list of accounts later received from the transaction management system (after it processes the customer transaction lookup request) may include additional metadata or information associated with each payment account (e.g., such as the current available account balance, any special offers available if the account is used in the current transaction, etc.). In some embodiments, the list of accounts later received from the transaction management system may include fewer accounts based on the application of rules at the transaction management system (e.g., such as the application of one or more customer, merchant or system rules). For example, a rule may specify that a specific payment account not be used for low dollar value transactions. In such a case, that specific payment account would not be included in the list of accounts sent from the transaction management system in response to the customer transaction lookup request. Put another way, the list of payment accounts received from the transaction management system after it processes the customer transaction lookup request may be a subset of all the accounts the customer has registered.

Substantially at the same time, the merchant 208 transmits a merchant payment authorization request message to the transaction management system 230 over a network 220. The transaction management system 230 matches the customer payment authorization request (received from the mobile device 202 over network 201) with the merchant payment authorization request (received from the merchant 208 over network 220) by using the checkout token 210.

In some embodiments where a dynamic checkout token 210 is used, no transaction details need be received by the mobile device 202 from the transaction management system 230—instead, the transaction details may be provided to the mobile device 202 via data encoded or otherwise contained in the dynamic checkout token 210. In some embodiments, the mobile device 202 requests or receives some or all of the transaction details from the transaction management system even where a dynamic checkout token is used.

In some embodiments, the transaction management system 230 then transmits a customer payment confirmation request message to the customer's mobile device 202, enabling the customer to have a final opportunity to confirm or cancel the payment transaction. For example, the customer may be prompted to "confirm" or "cancel" the payment transaction. The prompt may provide additional information about the transaction and the selected payment account so the customer can have detailed information about the transaction before selecting "confirm" or "cancel". In some embodiments, customers may be given the opportunity to set preferences or otherwise configure the mobile payment application to enable or disable certain messages or transaction steps. As a specific example, customers may be given the opportunity to receive (or not receive) customer payment confirmation request messages.

Once the final confirmation to proceed with the payment has been received from the customer's mobile device 202, the transaction management system 230 creates an authorization approval request message for transmission through one or more payment processing network(s) 232 to cause the authorization, clearing and settlement of funds for the transaction. This request message includes the transaction details, such as the amount of the transaction or other information, from the merchant payment authorization request (received from the merchant 208) and the actual payment credentials associated with the payment account selected by the customer. The actual payment credentials may be obtained by using the payment account selection information and performing a lookup of actual payment account credentials previously stored in a database or location accessible to the transaction management system 230. The authorization approval processing may be performed using standard financial authorization processing over one or more payment processing networks 232 (e.g., such as the VISANET® network operated by Visa, Inc., an Automated Clearing House system such as NACHA, or the like). Once the availability of funds is confirmed, the transaction management system then sends a merchant payment authorization response message to the merchant 208 so the transaction can be completed at the point of sale 212, and a customer payment authorization response message to the customer's mobile device 202.

Customer Registration Process

Pursuant to some embodiments, before a customer can use a mobile device (such as the mobile device 202 of FIG. 2) to conduct a purchase transaction using the present invention, the customer must perform a registration process such as the process described in conjunction with FIG. 3. Data collected or provided in association with the process 300 may be stored at or be accessible to one or more databases associated with the transaction management system 230. An example database is shown in FIG. 9 (which will be referenced in conjunction with the following description of process 300).

The registration process 300 of FIG. 3 begins when a customer first (at 302) interacts with a registration server (which may be a component of, or related to, transaction management system 230 of FIG. 2) to initiate a registration process. For example, the customer may operate an Internet browser (either on a mobile device or another computing device) to access a registration Web page associated with the registration server. The registration Web page may request the customer provide some identifying information to begin the account creation process. For example, a customer may provide name, address and other contact information as well as contact preferences, including one or more email addresses and phone numbers. A customer identifier or other unique record (or records) may be established in a database as illustrated in table of FIG. 9. A customer identifier U1002 may be used to uniquely identify the customer. The customer identifier U1002 may be an alphanumeric identifier assigned by the transaction management system 230 or may be information based on or provided by the customer (e.g., such as a mobile phone number or identifier associated with a mobile device 202).

Processing continues at 304 where the customer establishes an account. In some embodiments, the account creation includes providing contact and identifying information associated with the customer, as well as information identifying one or more mobile device(s) from which the customer wishes to make transactions. Each mobile device 202 may, for example, be identified by its phone number and/or other unique identifier(s) (such as a hardware serial number, an ASIN, a UUID in the case of an iPhone, a component serial number such as a CPU serial number or the like). In some embodiments, where the customer registers from a browser on their mobile device, or by first downloading a payment application having a registration module onto their mobile device, the system may capture unique identifying information associated with the mobile device (e.g., such as a hardware serial number, an ASIN, a UUID or other device identifiers).

Processing continues at 306 where the customer provides information about one or more payment devices or payment accounts that the customer wishes to have associated with the payment system of the present invention. For example, the customer may enter information about one or more credit cards, debit cards, gift cards, bank accounts, checking accounts, or the like. The information about each account includes the actual payment credentials or sufficient information to process a transaction using the account. For example, with respect to a credit or debit card, the information may include: the primary account number (or PAN), the expiry date, and the verification code. With respect to a bank account, the information may include: the routing number and the account number. Other information, such as bank or issuer information may also be entered at 306. Some or all of the information may be stored in one or more fields of the database table shown in FIG. 9. As shown in FIG. 9, a customer may register several payment accounts, and the details are shown as being stored in a field 1010 labeled "Account(s)".

Referring to the illustrative examples introduced above, the customer named "Jane" has entered details about four of her payment accounts that she would like to be able to utilize in conjunction with the present invention, including: a Chase Credit Card, having a primary account number (or "PAN") of #######, and a card expiration date of 05/12, a Webster Bank Checking account having an ABA number of ####### and an account number of ########, a Webster Bank Visa debit card having a PAN of ######## and a card expiration date of 06/11, and a Starbucks gift card having a PAN of ###### and an expiration date of 8/10. Additional account identifying information may be provided as required (e.g., in some embodiments, for payment cards, a card verification number may also be provided). The data provided in the table of FIG. 9 is securely stored in a PCI compliant database. In some embodiments, by securely storing payment card data (including expiry date and verification codes), payments made using the present invention may qualify for reduced interchange as "card present" transactions. Pursuant to some embodiments, a customer may add, remove or update account information as needed.

Processing continues at 308 where the customer may optionally establish one or more preferences or rules associated with the use of one or more of the accounts entered at 306. For example, the customer may designate one of the accounts as the "primary" or default account. Other rules and preferences may also be set to enable accounts to be selected and used in an efficient and logical manner. For example, a customer may specify priorities or other account-based rules to indicate how a particular payment account should be treated with respect to other payment accounts. A customer may also specify spend limitations or balance requirements that govern how and when a payment account is to be presented as an option. A customer may also specify the order in which accounts are displayed on the mobile phone, based on what merchant they are purchasing from, or the funds available in each account, or the rewards received for using each account.

In some embodiments, a rule (such as a customer-specified rule), may cause a payment process to proceed more quickly, or with fewer customer steps. For example, a customer may specify that when making a purchase (or a certain type of purchase, such as a purchase below a certain dollar amount) at a specific merchant, that a default payment account be used. In such situations, a purchase transaction using the present invention may proceed without need for the customer to select or confirm the selection of a payment account—it is done automatically by application of the customer-specified rule.

Those skilled in the art will appreciate, upon reading this disclosure, that a wide variety and type of account-level rules may be specified to allow a customer to manage how (and when) payment accounts are presented as payment options.

In the illustrative embodiment introduced above (and in the table of FIG. 9), the customer named "Jane" has specified the following account preferences: (i) she wants to reduce the use of credit, and (ii) she wants to reduce transaction fees. Jane has also specified rules to be applied when specific payment accounts are analyzed for use in a given transaction: (i) her Starbucks gift card balance should be used where possible (having been assigned the highest priority), (ii) her checking account or the debit card associated with her checking account should be used as the second highest priority (although she prefers not to use the checking account if a transaction would reduce her balance to below $1,000), and (iii) her credit card should be the final payment option, having the lowest priority.

When Jane uses her mobile device to conduct a transaction using the present invention, the transaction management system will compare the rules and preferences Jane has specified to the details of the transaction to recommend which payment account(s) are available for the transaction. For example, if Jane uses her mobile device to purchase a cup of coffee at Starbucks, the transaction management system will let her know that she can use her Starbucks gift card for the purchase. In this manner, customers having a variety of payment accounts may be presented with choices of payment options that are based on their overall preferences and usage objectives. Further, a payment account that is unavailable or unsuitable for a particular transaction may be identified as such by the transaction management system so that the customer need not be presented with that payment account as an option (e.g., if Jane is purchasing gas at a gas station, she will not be presented with the Starbucks gift card as a payment option for that transaction). Further details of how payment accounts are presented to a customer during a transaction are provided below in conjunction with FIG. 4B and FIG. 8.

In some embodiments, processing may continue at 310 if the customer operates or uses mobile devices that are capable of operating an application that is associated with the present invention (such as an iPhone or an Android phone). At 310, the customer is prompted to download and install an application on their mobile device. The application allows the customer to operate their mobile device to quickly and easily conduct payment transactions pursuant to the present invention. For phones or devices that are not capable of running such an application, a link or Web page may be created or provided to the customer that may be accessed via a mobile phone browser, so that the customer can conduct payment transactions pursuant to the present invention.

Once a customer has established an account and registered one or more payment accounts with the transaction management system, the customer may utilize the system of the present invention to conduct purchase transactions at merchants that support transactions of the present invention.

Transaction Process

Figure 4A:
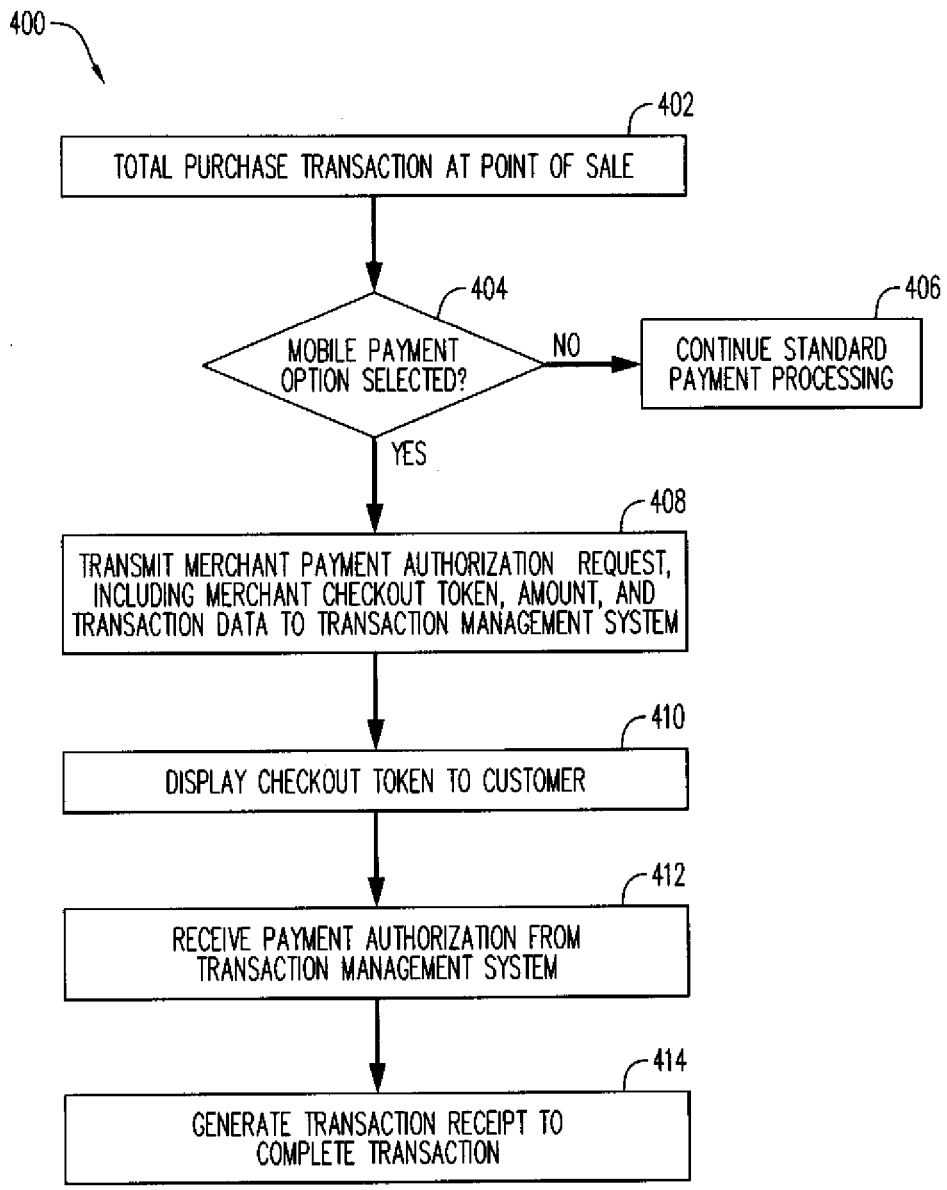
FIGS. 4A-4C are flow diagrams depicting a transaction process pursuant to some embodiments.
Figure 4B:
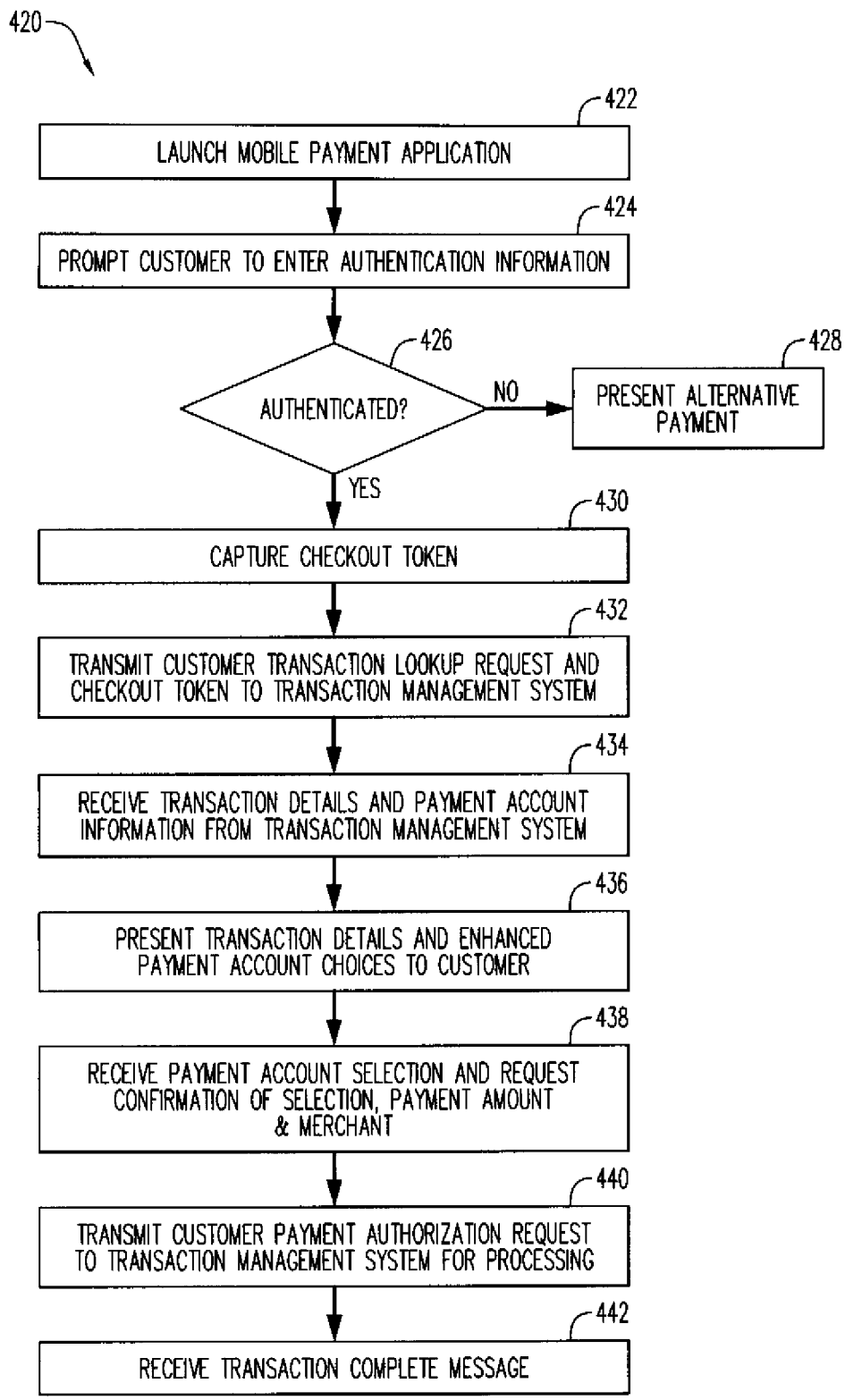
Figure 4C:
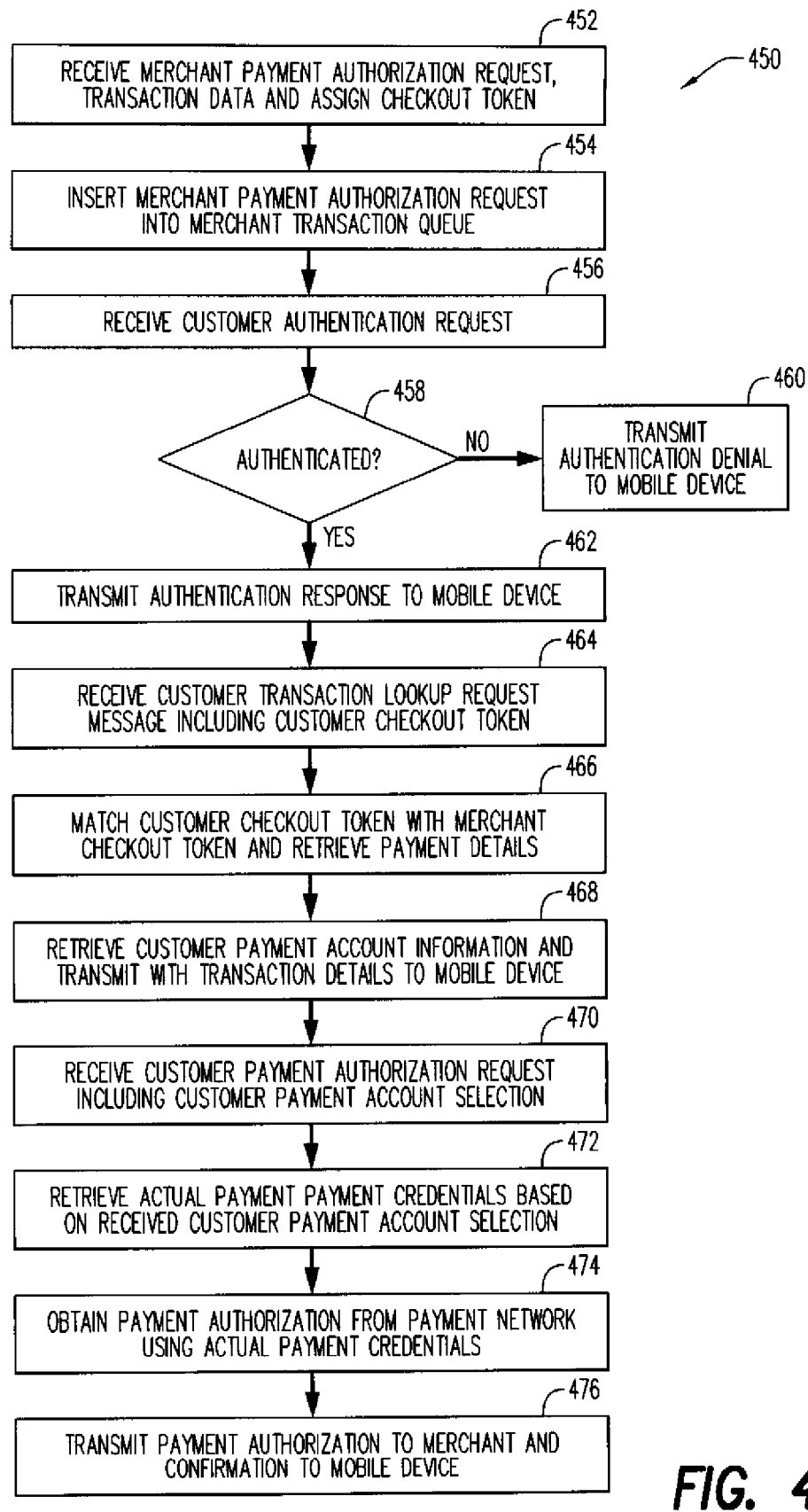

An illustrative transaction process 400 will now be described in conjunction with FIGS. 4A-C (while also referring to the components of system 200 of FIG. 2). FIG. 4A depicts a transaction process from the perspective of a merchant (such as merchant 208), FIG. 4B depicts a transaction process from the perspective of a mobile device (such as mobile device 202), and FIG. 4C depicts a transaction process from the perspective of transaction management system (such as system 230 of FIG. 2). In general, the three transaction processes are performed in parallel or in conjunction with each other to perform a payment transaction pursuant to some embodiments of the present invention. Each of the transaction processes of FIG. 4 begin when a customer (who participates in the payment system of the present invention) is done shopping or is otherwise ready to make a purchase at a point of sale. For example, the processes may begin once a customer has selected goods or services to purchase and has taken them to a point of sale to purchase them. The point of sale may be a checkout lane at a retail store, an electronic shopping cart at an ecommerce store, a clerk or waiter at a restaurant, a gas station pump, or the like, or it may be one person using the present invention to pay another person.

Reference is first made to FIG. 4A, where a transaction process 400 is shown. The process of FIG. 4A is generally presented from the perspective of a merchant. For example, transaction process 400 may be performed by or at a merchant 208 and may be performed using software or systems associated with a merchant 208 such as, for example, merchant system 209 and point of sale device 212. Processing begins at 402 where the goods or services are rung up to total the purchase. Processing continues at 404 where the point of sale device 212 (or the clerk) prompts the customer to select a payment option, and a determination is made whether a mobile payment option is selected. If the mobile payment option is not selected, processing continues at 406 where standard payment processing or processing to complete the purchase using another payment option occurs.

If the mobile payment option is selected, processing continues at 408 where the merchant system 209 create and transmit a merchant payment authorization request, including a merchant checkout token (in embodiments where a checkout token is sent from the merchant), a transaction amount, and other transaction data (such as a terminal identifier, date, time, enhanced transaction data, etc.) to a transaction management system 230 (e.g., via a network such as network 220). The merchant payment authorization request is then used by the transaction management system 230 (as will be described further below in conjunction with FIG. 4C), to create a pending transaction in a merchant transaction queue. In some embodiments, as discussed above, the checkout token is not sent from the merchant system 209. Instead, the checkout token may be retrieved, generated or "looked up" by the transaction management system 230 in response to a message received at 408 from merchant system 209. For example, the checkout token may be looked up from a table associating a merchant ID (received at 408) with a static checkout token. In some embodiments, the checkout token could be generated by the transaction management system 230 when it receives the merchant payment authorization request at 408, and then the checkout token would be passed back to the merchant system 209 as part of the acknowledgement of the merchant payment authorization request. Although processing at 408 is shown as including a checkout token transmitted from the merchant to the transaction management system 230, in some embodiments, the token is not sent at 408, instead, the checkout token is provided by the transaction management system 230.

Processing continues at 410 where a checkout token is displayed or otherwise provided to the customer. Processing at 410 may be performed in a number of different ways, depending, in some embodiments, on whether a static checkout token or a dynamic checkout token is used. In situations where static checkout tokens are used, the display of the checkout token may be performed prior to the transaction by placing or otherwise displaying a static checkout token in an area associated with the point of sale device 212. In some embodiments, for example, static checkout tokens may be used in applications where a merchant would not want to incur the cost of purchasing and deploying a display device at the point of sale for displaying dynamic checkout tokens, and where only one checkout event occurs at a time at each checkout location. For example, a sticker or placard may be created with the static checkout token on it and displayed near the point of sale device 212 so customers and clerks can easily see the static checkout token. The static checkout token may be used for multiple transactions and may remain static for a relatively long period of time (such as days, weeks, months, or even longer). The static checkout token is generated such that it uniquely identifies details about the merchant, including but not limited to the location of the store, the merchant's account number, and the specific point of sale device 212 within a store with which the static checkout token is associated, and may be an alphanumeric identifier (e.g., such as a 4-7 character identifier) allowing it to be easily keyed in or entered into a mobile device 202, or it may be an encoded bar code image, or a radio signal such as that produced by an RFID device.

In embodiments where dynamic checkout tokens are used, processing at 410 may include the generation and then the display of the dynamic checkout token. For example, the dynamic checkout token may be created as an encoded bar code image that, when decoded, reveals an identifier that uniquely identifies a number of items associated with the point of sale device 212 and a particular checkout transaction. The decoding of the bar code image may, in some embodiments, reveal a checkout identifier that may be used (e.g., by the transaction management system 230) to identify information about the POS device 212 such as, for example, the merchant, the particular POS device 212, the lane or checkout location, the location of the merchant, or a particular transaction, etc. For example, each dynamic checkout token may be associated with: a particular merchant, a specific checkout lane at a specific merchant location, a particular checkout transaction, and a specific POS device. Each POS device 212 may have a POS identifier, and that POS identifier may be associated with a specific dynamic checkout token generated for a transaction. As a specific illustrative example, a dynamic checkout token generated for a grocery store may identify the name of the grocery store (e.g., such as the chain), the location of the grocery store (such as the specific geographical location of the store), the checkout lane within the specific store, and the POS device in the checkout lane. In some embodiments, for each dynamic token there may be several ways the information encoded in the token can be used by the transaction management system 230 to reveal information about the merchant or the actual transaction. First, the information can be stored inside the checkout token itself (in such scenarios, the token may not be appropriate for key-entry by a human, and instead should be captured or scanned by the mobile device). Next, the checkout token itself may be an identifier that can be used to "lookup" or reference the transaction details stored in a database table. In such a case, the checkout token may be, for example, a 4 to 7 position combination of alphanumeric characters or shapes. Such tokens may be either key-entered by a human or captured by a mobile device.

In some embodiments, the dynamic checkout token can further be generated to reveal the total transaction amount and other transaction details associated with the transaction for which the dynamic checkout token was generated. In some currently preferred embodiments, however, the dynamic checkout token does not include the total transaction amount or other transaction details—instead, the additional payment related data is transmitted from the merchant to the transaction management system for later matching and transmission to the mobile device. The more information that is included in a checkout token, the more complex it becomes for the mobile device to decode the information when it is encoded as a barcode image, or radio signal, which can impact the speed of the checkout process. In addition, keeping checkout tokens short (e.g. 4 to 7 characters, number, or symbols) makes it possible for customers to use the present invention with any phone that has a browser, greatly expanding the number of phones (no image scanner or wireless receiver would be required to be present in the phone) and therefore the number of consumers who could utilize the present invention. Once authenticated, the customer can key in the checkout token presented by a merchant to make a payment transaction. For this reason, it is frequently desirable to have transaction detail information be delivered to the mobile device through a network 201 rather than through the checkout token 210. In some embodiments, dynamic checkout tokens (as well as static checkout tokens) may be displayed on a display device 213 associated with a point of sale device 212.

In either embodiment, the checkout token 210 is displayed for scanning, capture or other entry by a customer using their mobile device 202 (as will be described further below in conjunction with FIG. 4B).

Processing at the merchant 208 continues at 412 where the merchant system 209 receives a merchant payment authorization response message from the transaction management system 230. The merchant payment authorization response message is generated by the transaction management system 230 after certain customer-related processing steps (described in FIG. 4B) and certain transaction management system-related processing steps (described in FIG. 4C) have been completed, and after a payment account selected by the customer (using their mobile device 202) has been authorized for the purchase transaction. Processing continues at 414 where the merchant system 209 is operated to cause the generation of a transaction receipt to complete the transaction.

Of note in the merchant processing described above is that at no point, in some embodiments, does the customer provide actual payment account data to the merchant 208. Those skilled in the art, upon reading this disclosure, will appreciate that such a process has desirable fraud and other benefits.

Pursuant to some embodiments, the process of FIG. 4A (and similarly, for FIGS. 4B and 4C) may be modified to allow the merchant to transmit a merchant payment authorization request before the transaction total has been calculated. Further, in such embodiments, the customer may capture the checkout token before the transaction total has been calculated. Such an embodiment generally proceeds as follows. First, at the beginning of every new checkout event, the merchant transmits a merchant payment authorization request to the transaction management system 230. This merchant payment authorization request contains information identifying the merchant and, in some embodiments, a point of sale terminal identifier and/or a unique transaction identifier, but it contains no amount due information, as the clerk has either not yet started to ring up the goods, or is in the middle of ringing up the goods. In response to this merchant payment authorization request, the transaction management system 230 generates a checkout token, and the merchant displays the checkout token to the customer (e.g., on a display device of the point of sale terminal).

Such an embodiment may be provided in situations where the merchant wants the customer portion of the checkout process to go as quickly as possible. By having the checkout token displayed at the start of the checkout process, the customer can capture at the beginning or middle (while items are still being scanned and totaled), and doesn't have to wait until the final transaction total is calculated. Capturing early allows the transaction management system 230 to retrieve the customer's available payment accounts that are appropriate for the merchant and customer based on any available rules.

Further, in some embodiments, by transmitting the merchant payment authorization request early in a transaction (before calculation of a transaction total), the transaction management system 230 has an opportunity to provide any relevant offers, coupons or loyalty incentives to the customer. For example, if the customer has registered her loyalty credentials with a particular merchant (such as the example introduced above, where Jane shops at Starbucks frequently), then before the total amount due is displayed, the merchant may want to cause an offer or promotion on the customer's mobile device that are appropriate for or tailored to the specific customer. This allows for advertising and promotional offers to be displayed to the customer before they finish the checkout process.

In general, a transaction process in which the merchant payment authorization request message is generated prior to the calculation of a total amount due proceeds as follows. First, the merchant payment authorization request message is generated and transmitted to the transaction management system 230. The request does not include the total amount due (but includes information identifying the merchant and/or the point of sale terminal or checkout lane). The transaction management system 230 creates a pending transaction record and transmits a checkout token to the merchant. The merchant then causes the checkout token to be displayed or presented to the customer. For example, it may be displayed to the customer on a display screen of a point of sale terminal while she is waiting for the transaction to be totaled. The customer then captures the checkout token using her mobile device 202.

The mobile device 202 transmits the information (after the customer authentication process, for example) to the transaction management system 230 and the transaction management system 230 matches the information with the pending transaction message. The system 230 returns information to the mobile device 202 including information identifying the merchant and possibly a list of available payment accounts (but no amount due as it has not yet been communicated to the system 230). Any targeted offers or advertisements may also be delivered to the mobile device at this time. While the customer is waiting for the transaction total, a message may be displayed on the mobile device 202 informing her that the device is "waiting for an amount due" (or similar message). After the merchant calculates the transaction total, the merchant transmits the total in an updated merchant payment authorization request message to the transaction management system 230. The system 230 uses this information to update the pending transaction record and then causes a message to be transmitted to the mobile device 202 to update the mobile device 202 with the total amount due (and may also include information about a list of available payment accounts that may be used in the transaction). The mobile device 202 may be updated to display the total as well as any loyalty savings (if any were earned in the transaction) as well as the list of available payment accounts. The customer then selects her desired payment account(s) to complete the transaction as normal. Those skilled in the art will appreciate that other modifications may be made to some or all of the processes shown herein to achieve different transaction flows.

Reference is now made to FIG. 4B, where a further transaction process 420 is shown. The process 420 is shown from the perspective of a customer operating a mobile device. For example, transaction process 420 includes a number of steps that may be performed by a customer operating a mobile device (such as the device 202 of FIG. 2) to complete transactions pursuant to the present invention. As described above, the process 420 may be performed in conjunction with the process 400 performed by the merchant 208. Processing begins at 422 where a customer who is a participant in the mobile payment program of the present invention launches a mobile payment application on their mobile device 202. The mobile payment application may be an "app" or computer program code stored on the mobile device 202, or, in some embodiments, the mobile payment application may be accessed by pointing a Web browser associated with the mobile device 202 to a Web page associated with a mobile payment application over the Internet. For the remainder of this discussion of process 420, it will be assumed that the mobile payment application is an application stored on the mobile device 202 (but such discussion is not intended to limit the application of the present invention to such an embodiment).

Processing continues at 424 where the customer is prompted to enter authentication information. For example, the customer may be prompted to enter information such as a user identifier, a password, or other credentials into a login screen displayed on the mobile device 202. Processing at 424 may also include collecting or generating device-related information for use in authenticating the customer. The customer authentication information, as well as any device-related information, are transmitted to the transaction management system 230 (e.g., over a network 201) for authentication by the transaction management system 230 (as described further below in conjunction with FIG. 4C). A determination is made at 426 whether the authentication passed or failed (e.g., based on a response received from the transaction management system 230). If the authentication failed, processing may continue at 428 where the customer is informed of the failure and is either prompted to use a different form of payment or to reattempt the authentication process.

Processing continues at 430 if the authentication processing is successful (that is, if the customer and the device have successfully been identified by the transaction management system 230), where the mobile payment application enables the customer to take steps to capture a checkout token associated with the point of sale. Processing at 430 may also include presenting a list of payment options to the customer. For example, the mobile device may display all of the customer's payment accounts that have been registered with the system. This allows a customer to view their available accounts (and, in some embodiments, the balance available on each account as well as other information) prior to completing a transaction.

For example, in some embodiments, the customer may be prompted to point a camera of the mobile device 202 at a bar code image of a checkout token and operate the mobile device 202 to capture the image. As another example, the customer may be prompted to key enter the checkout token or otherwise enter it into the mobile device 202. In some embodiments, the checkout token 210 is captured by a camera or other image capture device of the mobile device 202 (e.g., as shown in the screen shot of FIG. 8A). For example, in some embodiments, the mobile application (downloaded and installed at 310 in FIG. 3) is configured to automatically detect and capture the checkout token 210 using a camera associated with the mobile device 202, or a wireless receiver.

In some embodiments, the camera may be operated in a continuous scanning mode where (without input from the user except, for example, a single push of the "Pay" button) the camera will rapidly (multiple times each second) capture an image of the checkout token, each of which is processed by the mobile application until it successfully decodes the image of the checkout token. This continuous scanning mode is useful, since it frees the user from repeatedly having to push the camera button to capture images in the case where the first images captured cannot be decoded by the application, due to, for example, the image not being clear enough due to the camera's viewfinder not completely capturing the image of the checkout token or for other reasons. To optimize and speed this process, the application may take into account specific attributes of the phone and its camera hardware, including the resolution of the image captured, the focal length of the camera, and other attributes. To further optimize the capture process, the size of the token, the angle of the surface on which the token is displayed, and other information may also be used to optimize the speed and accuracy of the checkout token capture process.

The mobile payment application installed on the mobile device 202 may interact with one or more other sensors (such as those described below in conjunction with FIG. 7, including, for example, a magnetometer, a gyroscope, and/or an accelerometer) during a capture process. In some embodiments, the payment application may interact with such sensors to improve capture accuracy. For example, the mobile application may adjust characteristics or control of the mobile device's camera hardware (e.g., such as by adjusting or controlling the image resolution and/or focal length of the camera), or adjust the algorithms and processes used to search the image data for a checkout token, based on data received from sensors such as a magnetometer, gyroscope, accelerometer or the like. For example, data associated with a mobile device, its sensors, and hardware characteristics (such as the focal length of the device's camera, the model of the phone, etc.) may be used as inputs for calculating a camera matrix or a projection matrix which is used to assist in compensating for image distortions including skew or the like. In this manner, data from mobile device 202 positioning or other characteristics may be taken into account when attempting to capture checkout tokens, thereby ensuring accurate and consistent capture of data. Further, this data and these compensation techniques may be used to more quickly locate a checkout token during an imaging or capture process.

As an illustrative example, referring to an example camera on an iPhone device, the projection matrix may be dependent on a few physical characteristics, including the camera focal length (which is 3.85 mm for one version of the phone), the imaging plane (which is ½" for the same version of the phone), the physical size of the position marks in a capture, and the physical distance between the position marks. Based on this information, embodiments are able to identify a spatial location for position marks relative to the camera, and from that data, a tilt of the checkout token relative to the camera sensor may be calculated. Pursuant to some embodiments, a projection matrix (or camera matrix) is used to describe the tilt with respect to the camera sensor and is used to adjust the capture process to ensure that checkout tokens may be efficiently and accurately captured even in situations where the customer is not holding the mobile device 202 in a manner where the camera sensor is directly orthogonal to the capture token. By improving the capture process using these techniques, the customer experience and speed and accuracy of capturing checkout tokens is improved.

In embodiments where the checkout token 210 is displayed in the form of an encoded bar code image, the payment application installed on the mobile device 202 may automatically operate to decode the bar code image to obtain the checkout token 210. The encoded bar code image may be presented in a number of different formats, including as a one dimensional or two dimensional bar code image or the like. In some embodiments, the checkout token 210 may be displayed as an unencoded string of characters that may be key-entered into the payment application of the mobile device. In some embodiments, the checkout token 210 may be read or entered into the payment application of the mobile device using other means, such as, for example, by wireless communication (e.g., such as by Bluetooth communication, by RFID detection, by optical character recognition, or the like). In some embodiments, processing may continue at 432 where the mobile device 202 transmits the customer checkout token to the transaction management system 230 as a customer transaction lookup request for payment account information and transaction details. In some embodiments, the transaction lookup request includes information associated with the identity of the customer (determined during the authentication process). This information, coupled with information about the mobile device 202, allows the transaction management system 230 to determine that it is interacting with an authorized user, allowing the system to locate the appropriate list of payment accounts for the user. As will be described further below in conjunction with FIG. 4C, the transaction management system 230 uses the checkout token and additional information received from the mobile device 202 to retrieve the transaction details received from the merchant (transmitted from the merchant at step 408 of FIG. 4A), and to retrieve a list of the customer's payment accounts that are suitable for the transaction.

Processing continues at 434 where the mobile device 202 receives the transaction details and payment account information from the transaction management system 230. For example, at 434, the device may receive a message including a number of data elements, including data associated with the current transaction (such as the transaction total, the merchant name and information, and other transaction details) as well as data identifying the customer's payment account(s) that may be used for the current transaction, and information about the order in which the payment accounts should be presented to the customer, as well as marketing messages or advertisements that might be displayed in proximity to the payment account information. The data identifying the customer's payment account(s) may include proxies or non-sensitive identifiers used by the transaction management system 230 to identify each account (rather than the actual payment credentials). Further, the data may include information about current account balances, loyalty programs, discounts, marketing messages, or the like associated with one or more of the available payment accounts.

Processing continues at 436 where the mobile device 202, under control of the mobile application, presents the transaction details and enhanced payment account choice(s) to the customer on a display screen of the mobile device 202. For example, if the customer (during the registration process 300) provided information about one or more payment accounts, the customer may be given the opportunity to select which one(s) of those accounts are to be used in the current transaction. For example, the customer may be presented with a display of options such as the one shown as FIG. 8B. In some embodiments, the display of options may include information about the status of each of the available accounts (e.g., such as the balance, the current interest rate, any current rewards or loyalty points, etc.) so that the customer may select the most appropriate account for use in the current transaction. In some embodiments, the actual payment account information is not stored in the mobile device; instead, a non-confidential or non-sensitive identifier is used to identify the account (where the actual account number is stored at the remote transaction management system 230). In some embodiments, the customer may select to split the transaction among two or more payment accounts.

Pursuant to some embodiments, the payment accounts available for use in the payment transaction are displayed in a priority or preference order based on any combination of: (i) rules or preferences established by the customer (e.g., such as the rules or preferences defined by the customer at 308 of FIG. 3 during a registration process), (ii) rules or preferences established by the merchant, (iii) rules or preferences established by the issuer of a payment account, and (iv) rules or preferences established by the transaction management system operator. A hierarchy or ordering of rules or preferences and their priorities may be specified to ensure that there are no conflicts between rules or preferences.

In some embodiments, the payment accounts available for use in the transaction are displayed in order based on one or more rules established by the merchant or based on the identity of the merchant 208. For example, the transaction management system may determine the identity of the merchant based on the checkout token 210 and may then determine if any merchant-specific rules have been established. Examples of merchant specific rules may include rules regarding interchange (e.g., such as rules which allow the merchant to reduce interchange by requiring PIN entry for debit cards, etc), or presenting payment accounts in a top to bottom order where the top account is the one that when used by the customer results in the merchant paying the smallest interchange fee, and the bottom account is the one that when used by the customer results in the merchant paying the highest interchange fee. Merchant specific rules may also include rules specifying that merchant-controlled payment types (such as private label credit cards, gift cards, etc) are to be displayed with a higher preference than other available payment types.

In some embodiments, the display of available payment accounts may also involve the application of one or more rules established by an operator of the transaction management system 230. For example, in some embodiments, the transaction management system operator may be compensated (e.g., by issuers or sponsors) to display certain payment account types with a higher priority. Those skilled in the art, upon reading this disclosure, will recognize that other types and combinations of rules and preferences may be applied to display a list of available payment accounts to a customer during transactions of the present invention.

Processing continues at 438 where the customer interacts with the mobile device 202 (e.g., via a touch screen display or the like) to select a desired payment account (or payment accounts in the case of a split tender transaction) to use for the current transaction. In some embodiments, the customer may be presented with a confirmation screen at 438 where the customer is prompted to confirm the transaction details (including the merchant, the transaction amount and the selected payment account(s)). An example of such a confirmation screen and transaction details is shown at FIG. 8C. Once one or more payment accounts have been selected for use, processing continues at 440 where a customer payment authorization request message is transmitted to the transaction management system 230 for processing. In some embodiments, the message includes data such as information identifying the selected payment account(s) as well as the transaction amount. In cases such as fine dining (or transactions of the sort involving the addition of a tip or further amount after an initial transaction total has been generated), the present invention may allow the customer to change the transaction amount to include a tip amount for service, requiring that the transaction amount be updated by the customer. The transaction management system 230 receives the message and processes it as described below in conjunction with FIG. 4C. If the transaction is successful (e.g., the transaction management system 230 is able to use the selected payment accounts to obtain a payment authorization from the financial institutions associated with the accounts), processing continues at 442 where the mobile device 202 receives a transaction complete message. Examples of such a message are shown below in FIGS. 8D and 8E.

Reference is now made to FIG. 4C, where a further transaction process 450 is shown. The process 450 generally shows steps from the perspective of the processing performed by the transaction management system (e.g., the transaction process 450 includes a number of steps that may be performed by a transaction management system, such as the system 230 of FIG. 2, or by systems or components related to a transaction management system to complete transactions pursuant to the present invention). As described above, the process 450 may be performed in conjunction with the process 400 performed by the merchant 208 and process 420 performed by a mobile device 202. Processing begins at 452 where the transaction management system 230 receives a merchant payment authorization request, including transaction data (such as a time stamp, terminal identifier, purchase details, or the like), an optional amount due (the "transaction amount"). The merchant payment authorization request may also include a checkout token or information used to assign a checkout token to the transaction. The merchant payment authorization request may also optionally include a checkout token if the merchant has previously been allocated a set of valid checkout tokens and is assigning those checkout tokens to transactions using its own system, rather than requesting them on a per transaction basis from the transaction management system. The merchant payment authorization request is received from a merchant 208 based on a transaction conducted by a customer who has selected to use a mobile payment option pursuant to the present invention.

In some embodiments, the transaction management system 230 receives the merchant payment authorization request message (at 452) first, and later receives a customer payment authorization request message (at 470). However, in some embodiments, a two step process may be performed in which a merchant first transmits a merchant payment authorization request (even prior to totaling a transaction for a customer) and then doing an "update" to the merchant payment authorization request message when the total has been calculated. In such embodiments, a customer may be allowed to capture the checkout token at the beginning of the checkout process so the merchant (or the transaction management system 230) can present the customer with one or more targeted offers for viewing while the customer is in line or otherwise waiting for the transaction to be totaled. The customer may, in such embodiments, be presented with a message informing them that the system is "waiting for a total" on their mobile device along with the targeted offers. Once the total is calculated, the merchant systems send an update to the merchant payment authorization request to the transaction management system which includes the total transaction amount, and then the customers' mobile display would be updated to show the transaction details and the list of payment accounts with all rules applied.

Processing continues at 454 where the system 230 inserts the merchant payment authorization request data into a merchant transaction queue. In some embodiments, the merchant transaction queue is a queue that contains a set of "pending" or unmatched transactions that have been initiated at merchant locations. In some embodiments, merchant payment authorization request data stays in the queue until matched with a customer payment authorization request received from a customer operating a mobile device. In some embodiments, a merchant payment authorization request may "time out" or expire if a matching customer payment authorization request is not received within a certain timeframe. In other embodiments, the merchant payment authorization requests in the merchant transaction queue may not be sent to the transaction management system; instead, they may reside on a server at the merchant location or some other location, and the transaction management system may have access to these merchant payment authorization requests so that it can match customer payment authorization requests received from mobile devices with the merchant payment authorization requests residing on the server at the merchant's location.

Processing continues at 456 where a customer authentication request is received from a customer operating a mobile device 202 (e.g., the customer authentication request may be received as a result of processing at step 424 of FIG. 4B). The customer authentication request includes customer authentication data as well as, in some embodiments, device authentication data. The transaction management system 230 uses the received information to determine if the customer (and/or device) can be successfully authenticated based on information previously stored at or accessible to the transaction management system 230. For example, in the situation where a password authentication is required, processing at 458 may include a determination of whether the password received at 456 matches a stored password for the customer. If the customer (and/or device) can be successfully authenticated, processing continues at 462, otherwise, processing continues at 460 where an authentication denial is transmitted to the mobile device 202.

If processing continues at 462, the system 230 operates to transmit an authentication response to the mobile device 202 allowing the mobile payment transaction to proceed. Processing continues at 464 where the system 230 receives a customer transaction lookup request message from the mobile device 202, including the checkout token (customer checkout token) from the mobile device. In some currently preferred embodiments, the message at 464 may also include (or be) a request for transaction details. Processing continues at 466 where the system 230 matches the customer checkout token received at 464 with a merchant checkout token received or looked up at 452. If a match is found, the transaction details associated with the merchant checkout token and the corresponding merchant payment authorization request are used to create a response to the request at 468. Further, processing at 466 includes identifying any payment account(s) associated with the customer that are available for use in the current transaction.

The transaction information (including merchant name and location and the transaction amount, for example) and the available payment account information, are transmitted to the customer's mobile device 202 at 468. Processing continues at 470 where the system 230 receives a customer payment authorization request message which includes the customer's selected payment account(s) for use in completing the transaction. At 472, the system 230 uses the payment account information received at 470 to lookup the actual payment credentials associated with the account(s) identified by the customer. The actual payment credentials may be stored in a system accessible to the transaction management system 230 which is PCI compliant (e.g., which securely stores and protects the actual payment credentials). At 474, the actual payment credentials are used to obtain payment transaction authorization from the appropriate payment network and/or financial institution. The payment authorization response is then sent to the merchant as well as to the customer at 476 to complete the transaction.

In this manner, embodiments allow payment processing to occur where the customer does not need to reveal payment account information to a merchant. Further, the customer is able to use a mobile device to complete the transaction. No card need be presented, nor does any customer information need to be transmitted over unsecured networks. Further, the customer can select from a number of different payment account types and may even create split transactions (where different account types are used in the same transaction).

To illustrate some embodiments of the transaction flow described above, an illustrative example will be provided (continuing the illustrative examples introduced above). Consider the example of the customer named Jane, who has an Apple iPhone and who has downloaded and installed the payment application of the present invention and who has registered four payment accounts to be used with the system of the present invention. If Jane orders a coffee at a Starbucks and chooses to pay using the payment system of the present invention, the clerk at Starbucks will ring up Jane's coffee order on a merchant terminal and communicate the total amount due to Jane. When Jane activates the payment application on her Apple iPhone, she may be required to perform an authentication process to confirm her authority to use the payment application. Once authenticated, a list of available payment accounts may be transmitted to and displayed on a display screen of her iPhone.

A checkout token may be generated by the merchant systems at Starbucks and displayed on a point of sale display so Jane can then capture an image of the checkout token with her mobile phone. The payment application on Jane's phone captures the checkout token, and transmits a customer transaction lookup message to a remote system. The system uses the token to match Jane's request with information sent from Starbucks about the transaction, and also uses it to retrieve a subset of Jane's available payment accounts that are appropriate for use in making this particular purchase. The list of available payment accounts may be retrieved by the payment application on Jane's mobile device communicating with the remote transaction management system (e.g., by causing the transaction management system to look up the list of payment accounts Jane has registered, and to look up and apply any relevant rules or preferences). In this case, Jane has indicated a preference that her Starbucks gift card be used whenever possible. As a result, her Starbucks gift card will be displayed as the top payment choice for this transaction. In some embodiments, an image of the card as well as current balance information will also be displayed to Jane so that she will know that she has sufficient funds to use the card.

Jane may then select to use her Starbucks gift card for the transaction by clicking on the image of the card and confirming her selection. The mobile device then transmits a payment request message to the transaction management server indicating that Jane wants to use her Starbucks gift card to complete a purchase associated with a particular checkout token for a particular amount. The transaction management server authorizes the transaction and sends a confirmation message to Jane and to the Starbucks point of sale system. In this manner, Jane enjoys the ability to complete the transaction even if she forgot her purse or her Starbucks card.

System Modules

Figure 5:
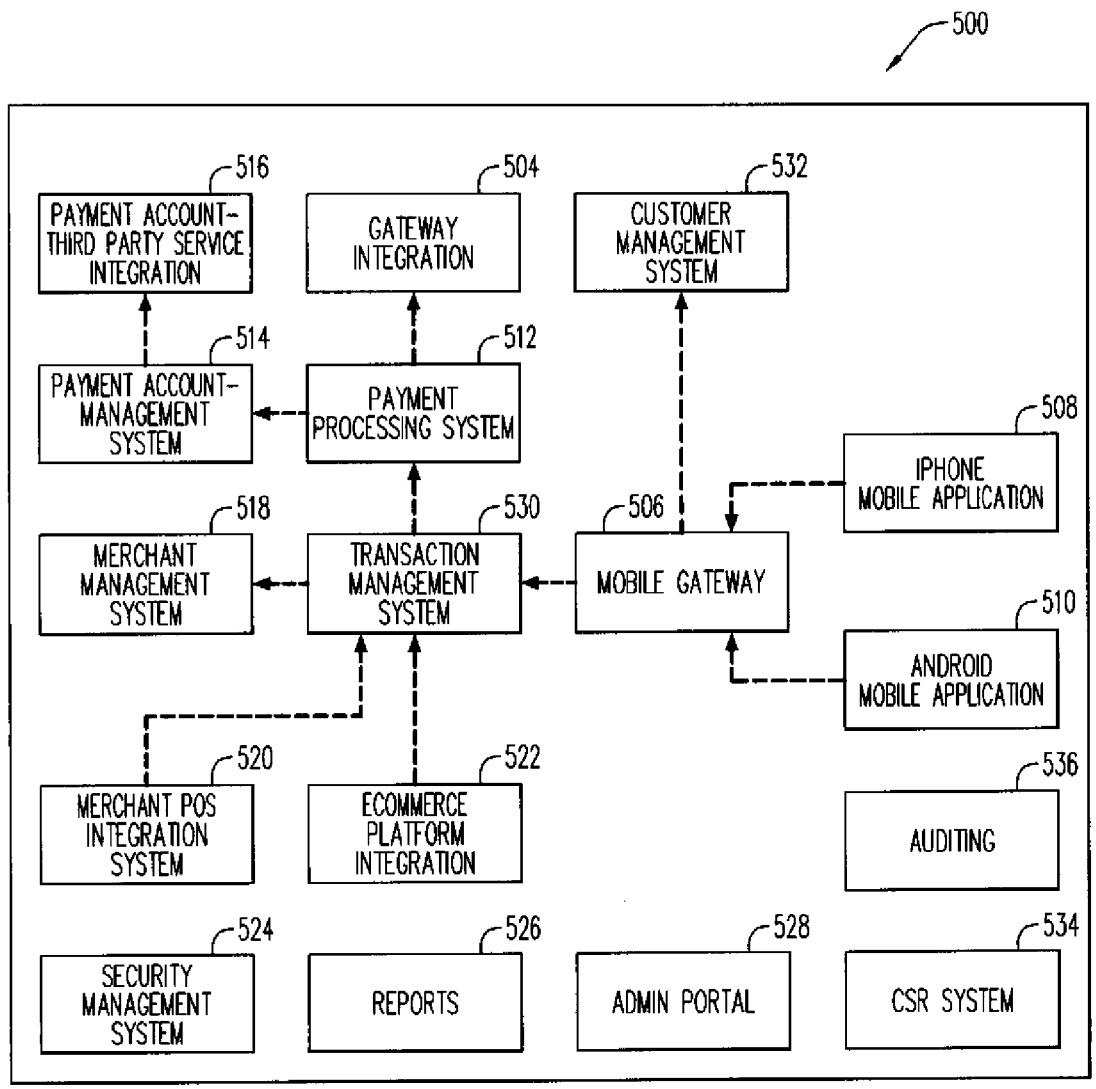
FIG. 5 is a block diagram depicting system components of a system pursuant to some embodiments.

Reference is now made to FIG. 5 where a block diagram illustrating a system 500 pursuant to some embodiments is shown. The system 500 and modules therein are provided for illustrative purposes only, and represent one possible implementation of a system pursuant to the present invention. Those skilled in the art will appreciate, upon reading this disclosure, that other implementations may also be used. System 500 includes a number of modules or components that, together, provide the functions of the transaction management system (such as the system 230 described above) to support the processing of payment transactions pursuant to some embodiments. System 500 may be deployed, for example, on one or more server systems. Those skilled in the art will appreciate that this illustrative architecture is just one example of an implementation, and that a number of design and configuration alternatives may be provided to achieve the functionality of the present invention.

As shown, system 500 includes a transaction management system core 530 interacting with a number of other components, including a mobile gateway 506 in communication with the transaction management system core 530. The mobile gateway 506 may be a server or system configured to operate as a mobile application communication enablement platform which supports multiple mobile devices such as iPhone and Android. Functionalities such as communication with transaction management system core 530 and customer management system 532 are implemented in this component. The mobile gateway 506 is used to handle communications and transaction processing between the mobile payment application and the transaction management system. The iPhone mobile application 508 implements and optimizes screen flows, image capturing etc using an iPhone specific software development kit.

An ecommerce platform integration 522 may be provided which is a component that implements application programming interfaces which enable the integration of the transaction management system with a variety of electronic commerce applications, including custom applications as well as commercial shopping cart applications. The ecommerce platform integration 522 may allow communication between electronic commerce systems and the transaction management system core 530 to allow payment transactions using features of the present invention to be implemented and performed in a variety of electronic commerce systems.

A merchant POS integration system 520 may be provided that enables various POS systems implemented in vendor specific technologies to be integrated with the transaction management system. For example, the client API may allow communication by and between PUS systems and POS terminals provided by NCR, IBM, Micros, Verifone, Ingenico or the like to allow payment transactions pursuant to the present invention to be implemented and performed using a variety of different POS systems and POS terminals.

A customer management system 532 is provided to allow the management of end customers using the payment system of the present invention. The customer management system 532 allows the management, registration and administration of customers, their profiles and provides functionalities such as login to system and access to payment history and preference data.

A payment account management module 514 is provided to manage payment accounts of customers. The module 514 implements account creation, establishment of preferences, etc. The module 514, in some embodiments, maintains account information such as payment account details, payment card numbers, or the like. The module 514, in some embodiments, is PCI compliant or otherwise configured to secure the payment account information. In some embodiments, this module maintains sensitive details related to payment account data. The module 514 is closely integrated with the payment processing system 512 in such a way that the payment processing system 512 need not store any sensitive account data.

A payment account third party service integration module 516 is provided to allow integration with partner systems to obtain information such as an account balance, or marketing messages for a payment account of a customer as well as to obtain other payment account related information.

A merchant management system module 518 is provided to allow the management of retailer or merchant profiles, their identification codes, and the like. For example, the module 518 may manage the distribution, assignment and use of checkout tokens for each merchant location, so that payment transaction requests received from customer mobile devices may be properly matched to pending transactions of the correct merchant. Other profile information, such as what payment instruments are accepted by the merchant, or a list of current offers or promotions the merchant wants to present to users of the present invention, may also be managed by this system.

A transaction management system core 530 is provided to manage and monitor all messages and transactions between the key components of the overall system. The functionality supported by the module 530 is described in general above in conjunction with FIGS. 1-4 and generally provides queuing and transaction matching and management for transactions between mobile applications and POS systems, ecommerce shopping carts, and the system components presented in FIG. 5.

One or more gateway integration modules 504 are provided to serve as an interface or bridge between the payment processing system module 512 and one or more payment gateways (such as those provided by Chase Paymentech®, Authorize.net, or the like).

A number of support and management modules may also be provided. For example, in some embodiments, a security management system module 524 may be provided to manage and provide security functions for the system 500, including the management of security keys, and roles and privileges. In some embodiments, an auditing module 536 is provided to perform auditing activities as specified by administrators. A CSR system module 534 is provided as a portal for customer service for merchants, end customers, and other entities. An admin portal module 528 is provided to perform all administration functions such as configurations, updates, account maintenance, etc. for merchants, end customers, and other entities. A reporting module 526 is provided to provide access to information and data for administrators, merchants, and end customers.

Those skilled in the art will appreciate that a number of other modules may be used to provide service, management, administration and other services to the system 500.

System Modules—Transaction Flow Overview

Figure 6:
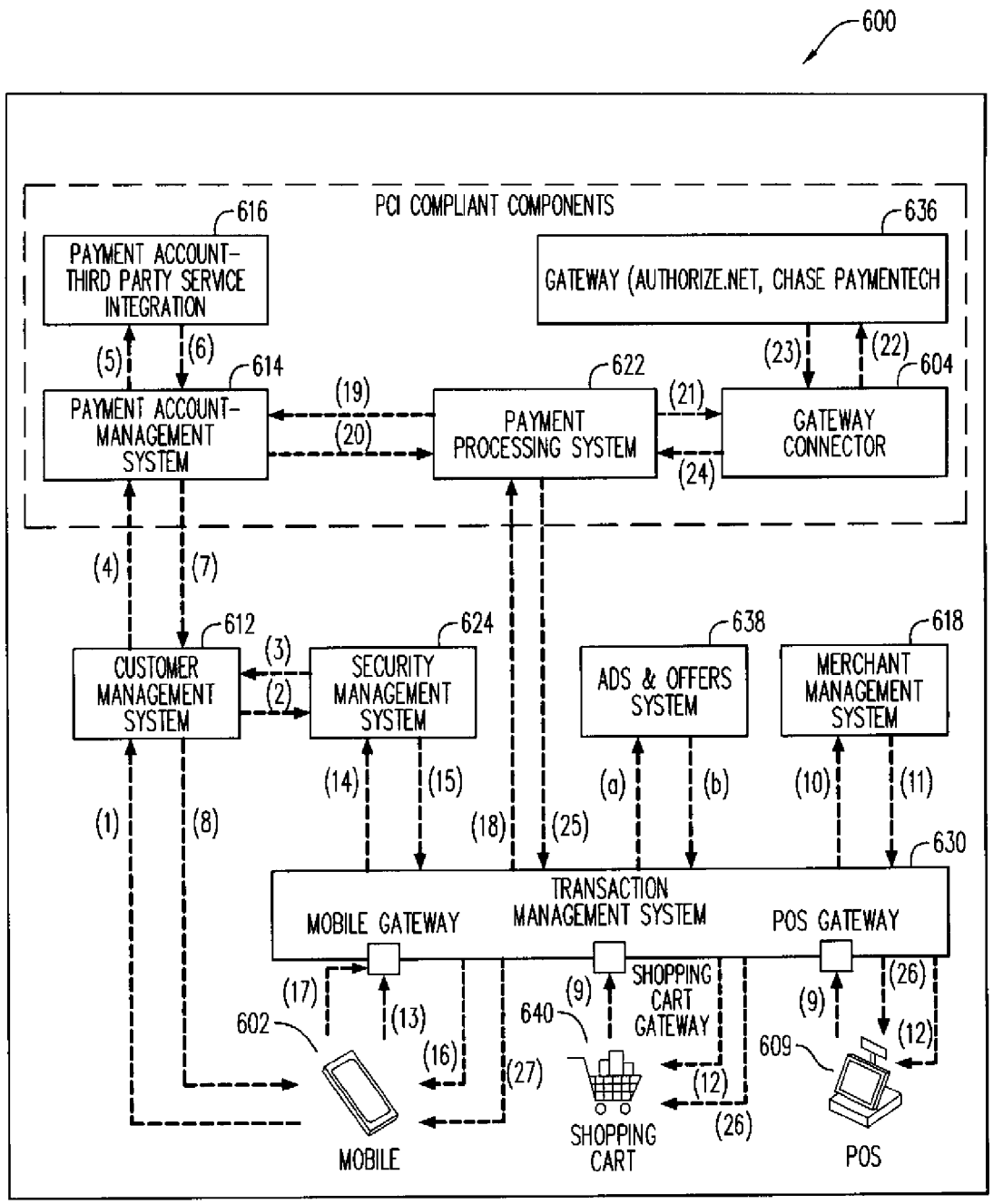
FIG. 6 is a block diagram depicting a transaction flow pursuant to some embodiments.

Reference is now made to FIG. 6, where a block diagram of a system 600 pursuant to some embodiments is shown illustrating one example embodiment of a transaction flow between selected modules or components of the payment system 600 pursuant to some embodiments of the present invention. The components of system 600 generally correspond to the components shown and discussed above in conjunction with FIG. 5 (and also include a number of external components such as those described above in conjunction with FIG. 2, such as point of sale devices, mobile devices, and the like). Those skilled in the art, upon reading this disclosure, will appreciate that payment system 600 is an illustrative embodiment, and that a number of variations of the illustrated system architecture and flows may be made to deploy embodiments of the present invention.

The block diagram of FIG. 6 shows a number of illustrative messages that may be generated between components of an illustrative system according to some embodiments of the present invention. Each of the messages (or "steps") that make up an example transaction are labeled with a numeric identifier on FIG. 6. A brief description of each of the "steps" are provided below. Those skilled in the art will appreciate that this is but one example of an implementation pursuant to the present invention.

At step "1", a message is transmitted from a mobile application on mobile device 602 to the customer management system module 612. When a customer wishes to conduct a payment transaction at a merchant, the customer interacts with the mobile application on the customer's mobile device 602 to initiate a login request with customer identification information. The login request may include a userid and password, personal identification number or other authentication challenge to authenticate the customer. Processing at this step may include processing to authenticate the mobile device 602 by comparing stored information about the customer's registered mobile device to the information received from mobile device 602. For example, this hardware or device authentication may include comparing stored details about the device to identifiable details transmitted in the message from the mobile device 602 (such as hardware identifiers, serial numbers, or the like, as discussed above).

Once the customer has been successfully authenticated, an Ads and Offers management system 638 may be accessed to retrieve any advertisements or offers that should be displayed to the customer in conjunction with the customer receiving a login response message indicating that they have been authenticated. The Ads and Offers management system 638 serves as a gateway enabling the transaction management system 630 to access advertisements and offers available from a variety of sources, including advertising and offer management systems and networks such as those operated by Google®, Microsoft®, Apple®, Yahoo®, Catalina Marketing®, and others. The transaction management system 630 may pass to the Ads and Offers management system non personally identifiable information related to the customer, information about the merchant (including the merchant's location), and information about the items being purchased or the payment instruments being considered in order to present to the customer the most relevant advertisements and offers at different times during the customer's use of the present invention. Ads and offers may be presented to the customer at any time when they are using the mobile device 602, including immediately after they have been authenticated, when they are deciding which payment instrument to use to make a payment, and after the payment has been completed and they are presented with an electronic receipt or e-receipt on the mobile device 602.

At step "2", the customer management system module 612, upon receipt of the login request from the customer, transmits a login request message to the security management system module 624. The security management system module 624 processes the login request by comparing received credentials (and any authentication data) to stored data to authorize or deny the login request. At step "3" the security management system module 624 transmits a login response message to the customer management system module 612. In this way, multiple modes of authentication are provided to authenticate the customer as well as the device. A number of variations of validation processes may be followed. For example, in one embodiment, an authentication may proceed as follows: (1) a customer launches the mobile payment application on their mobile device, (2) mobile device-related information is validated, and (3) the customer credentials are validated (e.g., by prompting the customer to provide a username, password or PIN). Those skilled in the art will appreciate that other authentication processes and flows may be used.

At step "4", the customer management system module 612 transmits a payment account summary message to a payment account management system module 614. The payment account management system would contain a list of all of the payment accounts the customer had registered with the system, including balance information and other details cached on the system. In most cases, the payment account management system would return the list of accounts and related information to the mobile device, as shown in step 8. In the case where the payment account management system needed to refresh the balance information associated with one or more payment accounts, the payment account management system module 614 (at step "5") would translate the payment account summary message request message into one or more requests that may be processed by the financial institution(s) that issued the accounts, or a financial institution intermediary with the ability to access the accounts. These requests would then be processed by a payment account—third party service integration module 616. The response (with account balance information and details) is received via the message at step "6" and then is passed back to the customer management system module 612 at step "7" for transmission to the mobile device 602 at step "8". The message at step "8" may also include a login response message along with any other appended messaging from the customer management system module 612 (such as any account updates or notifications that need to be presented to the customer). At this point in time, the customer is logged in to the payment application on his or her mobile device 602, and knows the account balance of any payment accounts that may be used in the present transaction.

In addition, at step "8", the transaction management system 630 may access the Ads and Offers management system 638 to locate appropriate ads and offers to present to the customer (on a display screen of the mobile device 602) in conjunction with the list of available payment accounts. Some of the offers or advertisements might appear on the visual representation of a payment account on the display screen. An example of such a presentation of an offer is the "Additional 5% off if used today!" offer shown on payment account 844a in FIG. 8b. In some embodiments, some messages, such as messages "1" and "8" may be processed through the mobile gateway.

In the situation where the customer is making a purchase using the present invention using an online shopping cart (e.g., such as in a checkout of an electronic commerce store), processing continues at the step labeled "9" (in communication with the shopping cart 640). In the situation where the customer is making a purchase using the present invention at a physical merchant point of sale ("POS") location, processing continues at the step labeled "9" (in communication with the POS device 609). In general, the messaging is similar in nature and will be described together for simplicity. Processing at step "9" involves the generation and transmission of a message from the shopping cart 640 or the POS 609 to the transaction management system 630 notifying the transaction management system 630 of the customer's selection of the present invention as the customer's payment choice for a particular transaction. The message at "9" includes information to notify the transaction management system 630 about the initiation of a transaction at the merchant associated with the shopping cart 640 or the POS 609. The notification may include details of the purchase amount, time and other information, including a merchant identifier. The transaction information received at "9" will be placed in a pending transaction queue at the transaction management system 630 awaiting subsequent information from the customer and mobile application to complete the transaction.

The transaction process continues at step "10" where the transaction management system 630 transmits a request to the merchant management system module 618 to authenticate the merchant and obtain merchant information associated with the merchant at which the POS 609 or shopping cart 640 transaction is taking place. At step "11", the merchant management system 618 transmits an authentication success or failure message back to the transaction management system 630, along with merchant information if the authentication request is successful. The merchant information may include detailed information associated with the merchant (such as, for example, the merchant name, address, and, in some embodiments, a unique merchant identifier which may be used to identify any relevant loyalty, rebate or other information that may be matched to the present transaction).

At step "12" the transaction management system 630 transmits a checkout token to the shopping cart 640 or the POS 609. The checkout token may be either generated for the transaction or retrieved from a set of one or more available checkout tokens. Pursuant to some embodiments, the messaging at steps "9" through "12" are done in the same "session" without terminating the shopping cart or POS session.

At step "13" the mobile application installed on the mobile device 602 is operated to transmit a message to the transaction management system 630 to notify the transaction management system 630 of the customer's intent to use the payment system of the present invention in the transaction. The message at "13" may include a checkout token which could be a decoded bar code, or a code keyed in by the customer, or a code derived from a wireless signal along with customer and device details. At message "14", the transaction management system 630 transmits a request to the security management system module 624 with a request to perform any necessary security checks on the customer and device information provided from the mobile device 602.

At "15", the security management system module 624 sends a response message to the transaction management system 630 with information about the security status of the mobile device 602 (and, for example, the status of the customer's account). Processing continues at "16" where the transaction management system 630 transmits a response to the mobile application on the mobile device 602 with information including the merchant information and the transaction details. The response "16" to the mobile application may include advertisements and offers from the Ads and Offers management system 638. At this point, the targeting of the ads and offers, in some embodiments, may be based on a rich set of data, including the customer's profile, the merchant's profile and the location of the store where the checkout event was occurring, the time of day, the items being purchased, the payment instruments that are available to the customer, and a number of other factors. The transaction management system 630 may pass some or all of this information to the Ads and Offers management system 638 which may interact with one or more ad and offer networks and select the offers to present to the customer on the mobile device 602 that have the highest probability of motivating the customer to act on one of the offers or advertisements.

At this point in time, the mobile application and the customer have been authenticated, and the mobile application now has detailed information about the merchant and the pending transaction (including, for example, the total payment amount requested by the merchant).

The transaction process continues at "17" where the mobile application on the mobile device 602 sends a customer payment authorization request message to the transaction management system 630. In particular, before generating and transmitting message "17", the customer selects which payment account he or she would like to use for the transaction. The customer may select from a variety of available payment accounts displayed by the mobile application on a display screen of the mobile device 602. The message transmitted at "17" may include a code that represents the particular payment account to be used by the customer (that is, the actual payment account information is not transmitted at "17"—instead, a proxy or representation of the payment account is sent).

At "18" transaction management system 630 creates a payment request message using the information received at "17" and transmits the request to payment processing system module 622. The payment processing system module 622 (which is in a PCI compliant server system, for example) transmits a message "19" to a payment account management system module 614 requesting a lookup of the actual payment account credentials for the selected account. The actual payment account credentials stored at the payment account management system 614 are then returned. The mapping between the proxy code and the real identifier (or actual payment credentials) is stored at the payment account management system 614. The actual payment account number and other related payment account information (such as, in the case of a credit or debit card, the expiration date) is then sent to the payment processing system module 622 at "20" to allow the module 622 to create a payment authorization request message "21" for submission to a payment gateway module 636 through a payment gateway connector 604 message "22". A payment authorization or decline and other status and related information may be returned from the gateway 636 to the payment processing system 622 via the payment gateway connector 604 which receives the authorization message via step "23" and passes the information back to the payment processing system module 622 at "24" for return to the transaction management system 630 at "25".

If the transaction is authorized, the transaction confirmation message (the transaction authorization or decline message) is transmitted to the shopping cart 640 or POS 609 at "26" to complete the transaction. A transaction completion (a transaction authorization or decline) message is also sent to the mobile application of the mobile device 602 at "27".

Those skilled in the art will recognize that other transaction messages may be provided, and other configurations of modules may be used to complete payment transactions pursuant to the present invention. The configuration of FIG. 6 is provided to illustrate one example embodiment of the present invention.

Mobile Device

Figure 7:
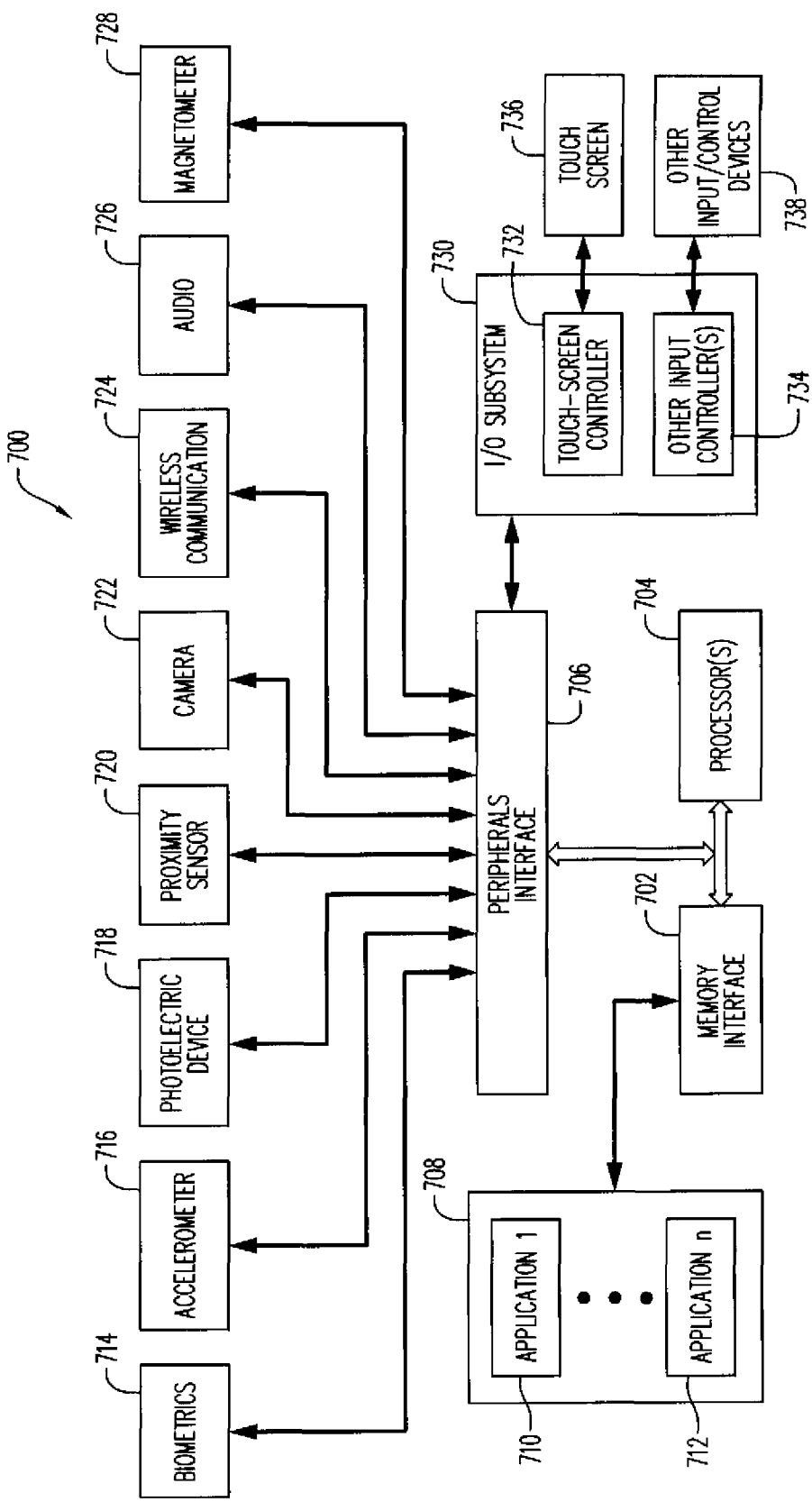
FIG. 7 is a block diagram depicting components of a mobile device pursuant to some embodiments.

Reference is now made to FIG. 7, where a block diagram is shown depicting components of a mobile device 700 pursuant to some embodiments. As depicted, the mobile device 700 includes a number of components which may be controlled or perform functions in conjunction with one more application programs 710-712 to perform the features of some embodiments.

The mobile device 700 can include a memory interface 702 one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 700 can be coupled by one or more communication buses or signal lines.

Sensors, devices and subsystems can be coupled to the peripherals interface 706 to facilitate multiple functionalities. For example, one or more sensors, including a biometrics sensor 714, an accelerometer 716, a photoelectric device 718, a proximity sensor 720, a camera 722, a wireless communication unit 724, an audio unit 726 and a magnetometer 728 may be provided to facilitate the collection, use and interaction with data and information and to achieve the functions of the payment applications described herein. For example, when provided, the magnetometer 728 may be used to calculate a position of the mobile device 700 in space, allowing improved capturing of checkout tokens.

The mobile device 700 may include one or more input/output (I/O) devices 730 and/or sensor devices. For example, input controllers 734 may be provided with a speaker and a microphone (not shown) to facilitate voice-enabled functionalities, such as phone and voice mail functions. In some implementations, a loud speaker can be included to facilitate hands-free voice functionalities, such as speaker phone functions. An audio jack can also be included for use of headphones and/or a microphone.

The I/O subsystem 730 can include a touch screen controller 732 and/or other input controller(s) 734. The touch-screen controller 732 can be coupled to a touch screen 736. The touch screen 736 and touch screen controller 732 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 736.

The other input controller(s) 734 can be coupled to other input/control devices 738, such as one or more buttons, rocker switches, thumb-wheel, infrared port, USB port, and/or a pointer device such as a stylus. The one or more buttons (not shown) can include an up/down button for volume control of the speaker and/or the microphone.

In some implementations, a proximity sensor 720 can be included to facilitate the detection of the customer positioning the mobile device 700 proximate to a point of sale terminal or display and, in response, to activate the camera or other reader to detect or capture an image of a checkout token.

Other sensors can also be used. For example, in some implementations, a photoelectric device 718 may be provided to facilitate adjusting the brightness of the touch-screen display 738. In some implementations, an accelerometer 716 can be utilized to detect movement of the mobile device 700, and a magnetometer can also be used to help detect the position of the mobile device. In some embodiments, the mobile device 700 may include circuitry and sensors for supporting a location determining capability, such as that provided by the global positioning system (GPS) or other positioning system (e.g., systems using Wi-Fi access points, television signals, cellular grids, cellular towers, or Uniform Resource Locators (URLs)). In some implementations, a positioning system (e.g., a GPS receiver) can be integrated into the mobile device 700 or provided as a separate device that can be coupled to the mobile device 700 through a peripherals interface 706 to provide access to location-based services. The positioning and location-based services may be used, for example, to tag data transmitted from the mobile device 700 to transaction management systems. For example, such location data may be used to further identify the identity of a merchant which the customer is interacting with during a payment transaction, and may also be used to assist in fraud detection by insuring that the mobile device is in close proximity to the point of sale location specified in the information received in or derived from a merchant payment authorization request.

The mobile device 700 can also include a camera lens and sensor 722. In some implementations, the camera lens and sensor 722 can be located on the back surface of the mobile device 700, or on the front surface. The camera can capture still images and/or video. The camera may be used, for example, to capture or capture images of a checkout token associated with a merchant point of sale location. In some embodiments, the operation of the camera 722 may be controlled by a payment application installed on the mobile device 700. As a specific example, when the payment application is activated to make a purchase transaction, the camera 722 may be placed in a ready mode of operation so that as soon as the camera lens and sensor 722 are placed proximate to a checkout token, the camera lens and sensor 722 may be operated to capture an image of the checkout token for use in the payment application.

The mobile device 700 can also include one or more wireless communication subsystems 724, such as an 802.11b/g communication device, RFID, NFC, and/or a Bluetooth® communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA,), 4G, LTE, etc.

In some implementations, additional sensors or subsystems may be coupled to the peripherals interface 706 via connectors such as, for example a Universal Serial Bus (USB) port, or a docking port, or some other wired port connection.

The memory interface 702 can be coupled to memory 708. The memory 708 can include high-speed random access memory and/or non-volatile memory, such as one or more magnetic disk storage devices, one or more optical storage devices, and/or flash memory (e.g., NAND, NOR). The memory 708 can store an operating system, such as Android, IOS from Apple, Darwin, RTXC, LINUX, UNIX, OS X, WINDOWS, or an embedded operating system such as VxWorks. The operating system may include instructions for handling basic system services and for performing hardware dependent tasks. In some implementations, the operating system can be a kernel (e.g., UNIX kernel).

The memory 708 may also store application programs 710-712 which act, in conjunction with the processors 704, to cause the mobile device to operate to perform certain functions, including the payment application related functions described herein.

The memory 708 can also store data, including but not limited to documents, images (including payment account card images and images containing advertisements and offers), video files, audio files, and other data. The mobile device 700 may be configured to operate using a number of different operating systems and to communicate using a number of different communications networks. Those skilled in the art will appreciate that the mobile device 700 may be sized as a handheld mobile phone, or other portable device such as a tablet computer or the like.

User Interface Examples

Reference is now made to FIG. 8A-8E which depict a number of illustrative user interfaces that may be presented to a user operating a mobile device (such as the mobile device 202 of FIG. 2) on a display screen of the device (such as the display 236 of FIG. 2) so that the customer can conduct payment transactions using features of embodiments of the present invention. Each of the customer interfaces are shown as being displayed on an Apple iPhone mobile device—those skilled in the art will appreciate that similar user interfaces may be displayed on other mobile devices.

Figure 8A:
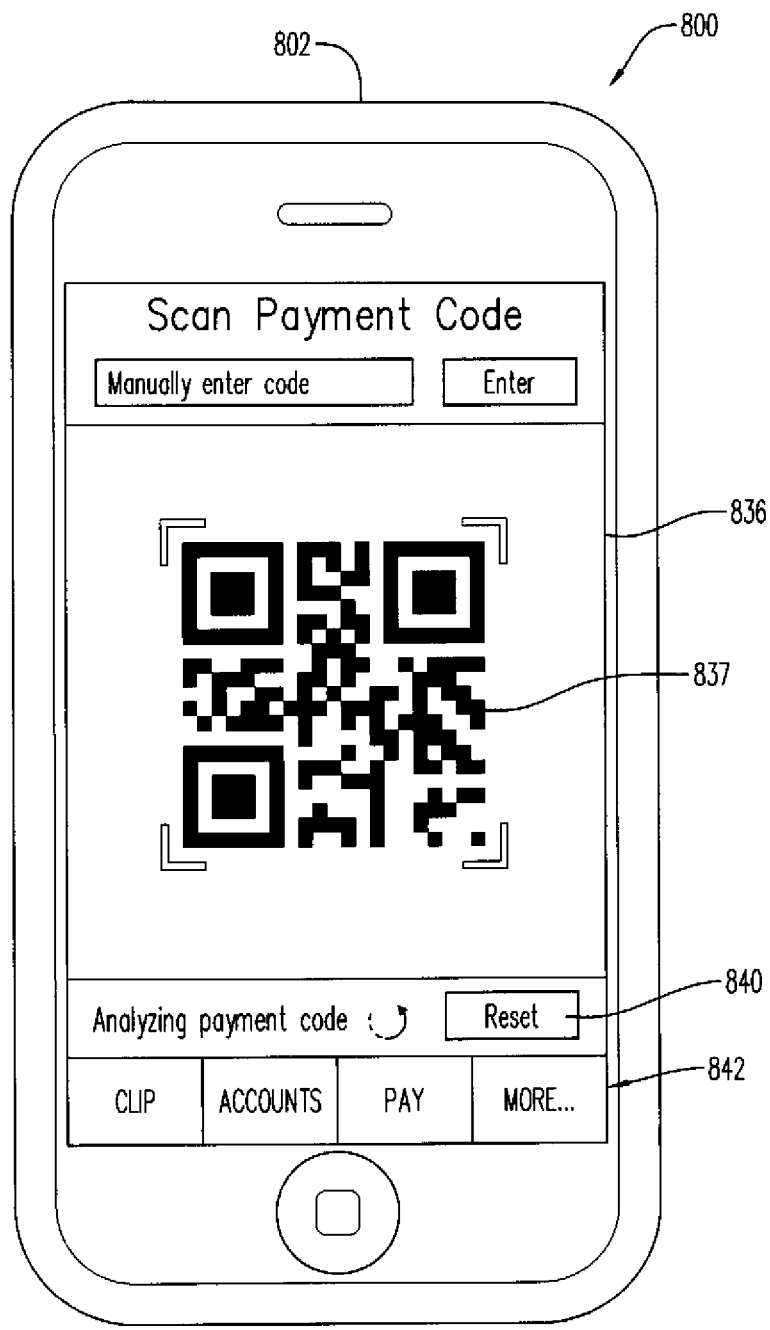
FIGS. 8A-8E are sample user interfaces associated with embodiments of the present invention.

Referring first to FIG. 8A, a mobile device 802 is shown which has a display 836 showing an image of a checkout token (represented as a dynamic two dimensional bar code image or "OR code" 837) which has been captured or imaged by a camera associated with the mobile device 802. The checkout token or code has been captured by a customer operating the mobile device 802 during the course of a payment transaction using embodiments of the present invention (e.g., the display shown in FIG. 8A may have been captured during the transaction processing described at step 430 of FIG. 4B, or step "13" of FIG. 6, etc.). In some embodiments, the mobile payment application running on the mobile device 802 is configured to automatically capture, decode, and transmit the code during the course of a transaction. While the code is shown as being an encoded two dimensional bar code image, those skilled in the art will appreciate that it may be displayed in any of a number of different formats, such as, for example, a 1 dimensional barcode format such as a UPC, code 39, EAN 8 or EAN 13, other two dimensional formats such as PDF 417 or Datamatrix, other n dimensional barcode formats, or alphanumeric text or symbols or the like.

The display of the mobile device 802 also includes a number of buttons or icons 840, 842 which allow the customer to perform functions associated with the payment system of the present invention. For example, as depicted, the customer may choose to reset 840 the capturing of the checkout code (e.g., in the event that the code was not properly captured or read) or the customer may select among other choices 842 including to clip or view special offers associated with the merchant location where the customer is currently shopping, view different payment accounts and related information, pay (which is shown as the currently selected option) or view more options.

Figure 8B:
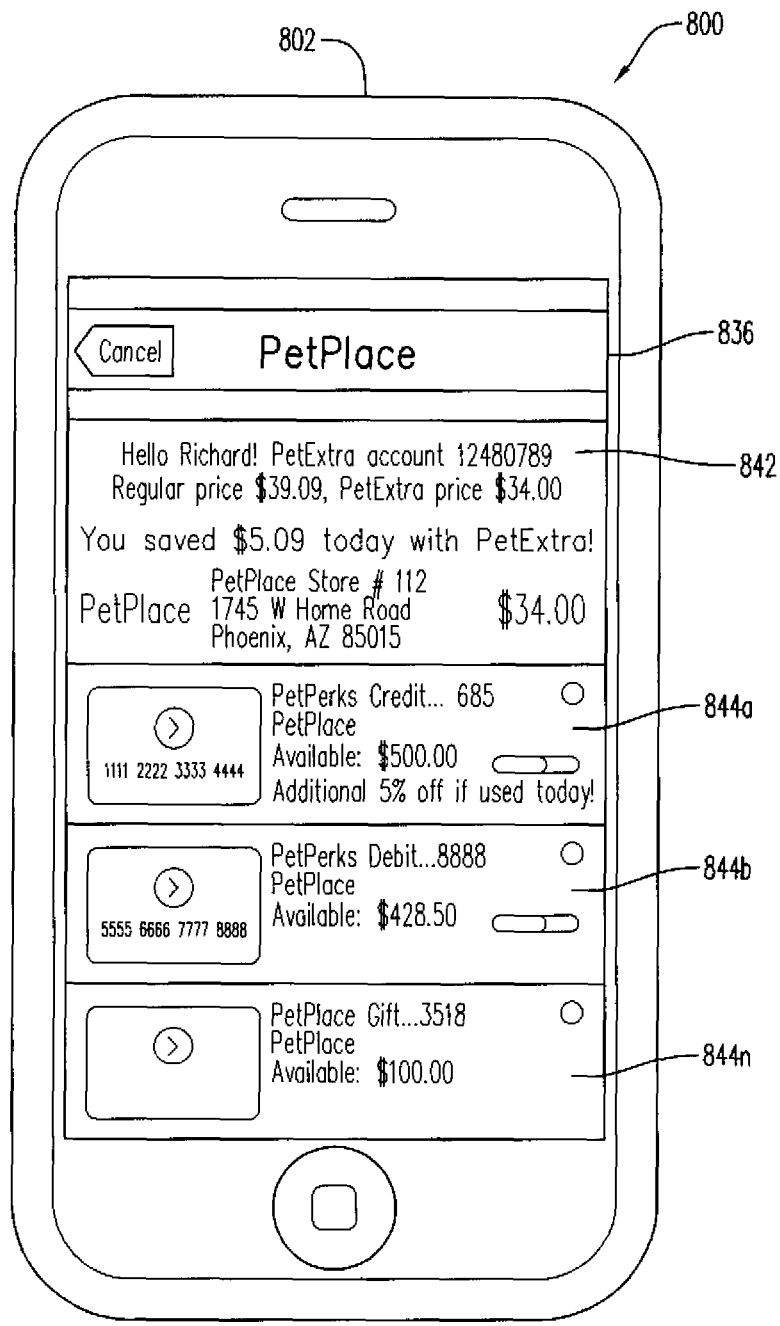
Figure 8C:
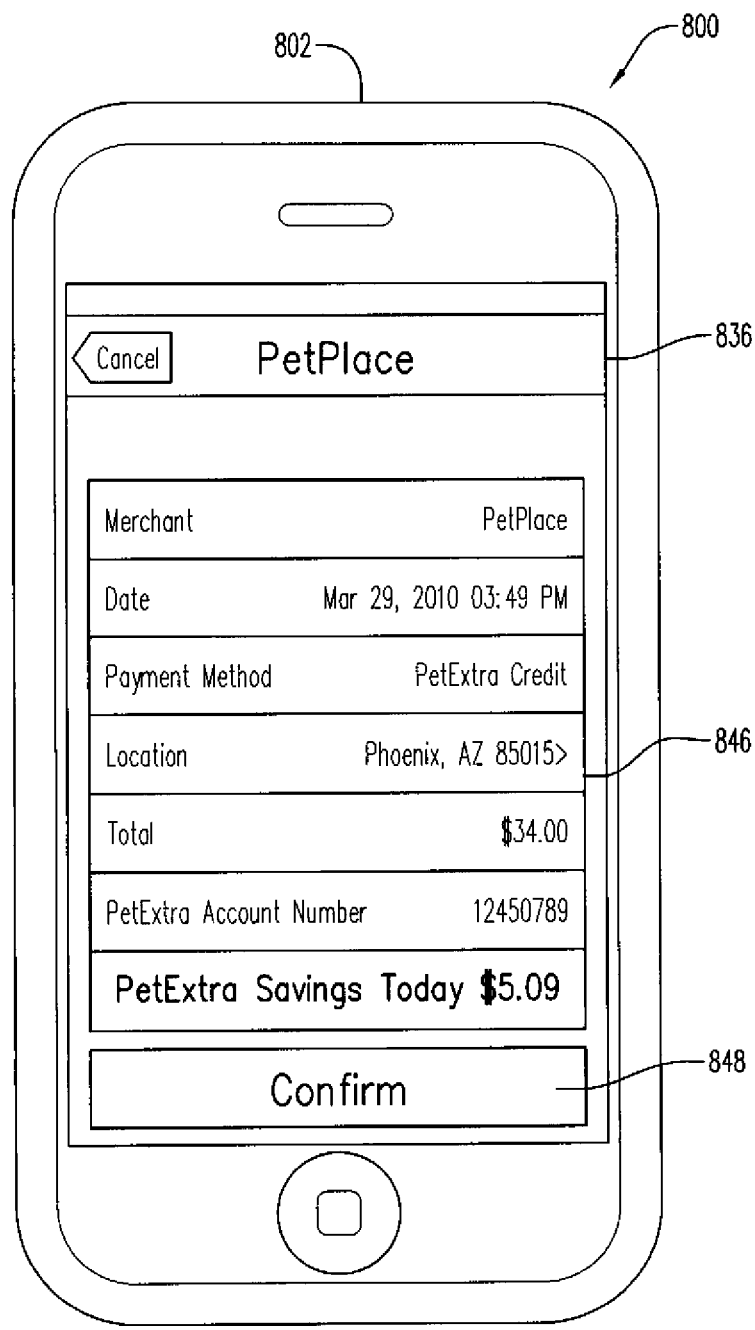

Referring now to FIG. 8B, a further user interface is shown, again on a display device 836 of a mobile device 802. In the user interface of FIG. 8B, the user has captured the checkout token or QR code (e.g., using the screen of FIG. 8A), and has received a response message from a transaction management system (such as the system 230 of FIG. 2) with details of the payment transaction that the customer is about to complete. In particular, the transaction management system has returned detailed transaction information about the purchase transaction, including merchant information and the purchase amount (shown as item 842). The user interface also shows the customer a number of available payment options 844a-n. The available payment options 844a-n may be shown in the order of preference or desirability based on, for example, customer preferences or rules established by the customer (e.g., pursuant to the process described above in conjunction with FIG. 3 or the like), by the merchant, or by the payment system operator. For example, as shown, a private label credit card is displayed as the first (or top-most) payment account 844a. Information about each of the payment accounts 844 may be displayed, including the current available balance as well as any reward, loyalty or other benefits associated with using that particular payment account in the current transaction.

In the user interface of FIG. 8B, the customer may select which of the available payment accounts 844a-n to use by simply clicking on the portion of the screen associated with the available payment account 844a-n desired. In some embodiments, further information about each available payment account may be viewed by clicking on a portion of the display screen. For example, details of each accounts balance, terms and conditions and other information may be viewed. The user interface of FIG. 8B may be presented to the customer in conjunction with transaction processing such as at step 436 of FIG. 4B, step "17" of FIG. 6.

Referring now to FIG. 8C, an (optional) further user interface is shown again on a display device 836 of a mobile device 802. The user interface of FIG. 8C is an optional interface (in some embodiments, a user may go directly from the interface of FIG. 8A or FIG. 8B to obtaining an authorization, such as in the case where the user has specified a single "default" payment account to use for all transactions. In this case the user may choose to not be presented with the interface of FIG. 8B, and would instead go directly from the interface of FIG. 8A to obtaining an authorization.). In the user interface of FIG. 8C, the customer has selected which payment account to use and has been presented with a screen to confirm the payment details using the selected payment account. The user interface may display, for example, transaction details 846 and a confirmation button 848. The transaction details show the detailed transaction information received by the mobile device 802 from the transaction management system. For example, the user interface of FIG. 8C may be displayed after the customer has selected a desired payment account, and immediately prior to the transmission of a message to the transaction management system (e.g., such as at step 438 of FIG. 4B, step "17" of FIG. 6).

Figure 8D:
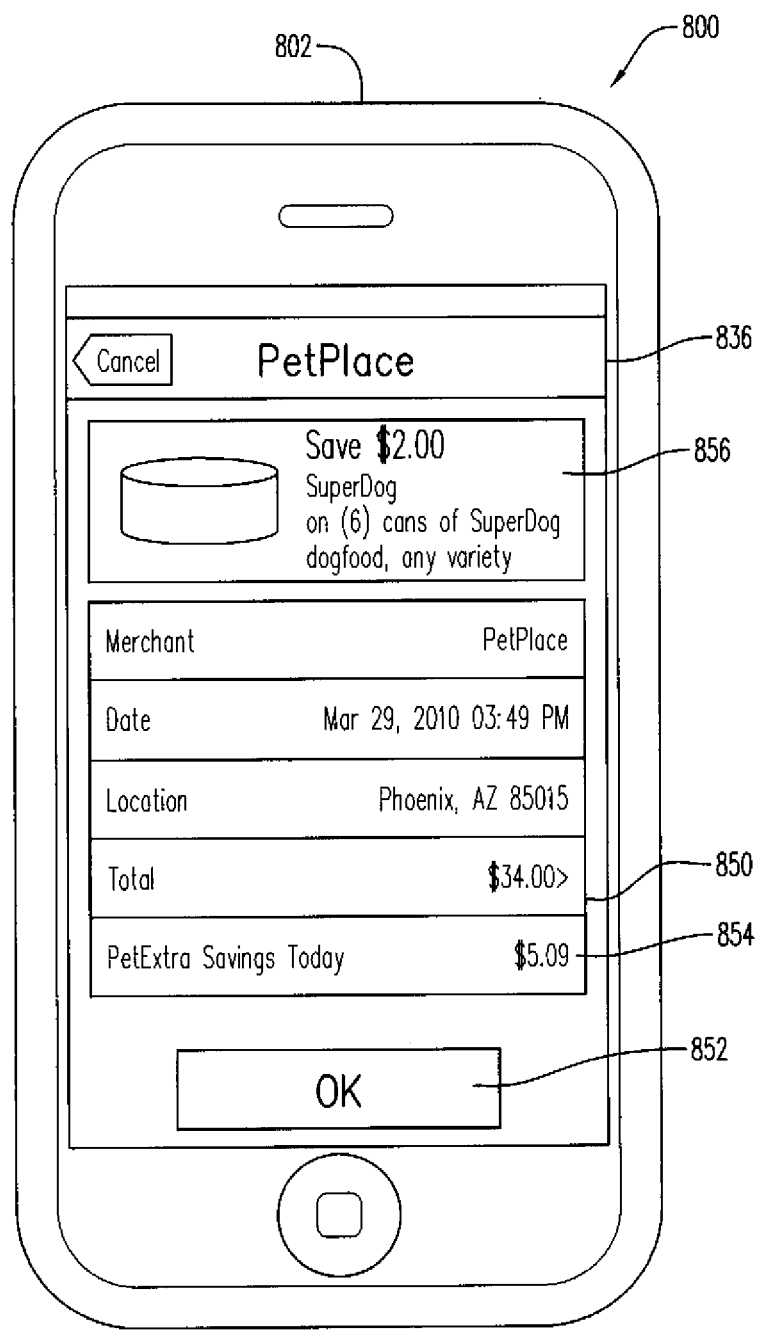
Figure 8E:
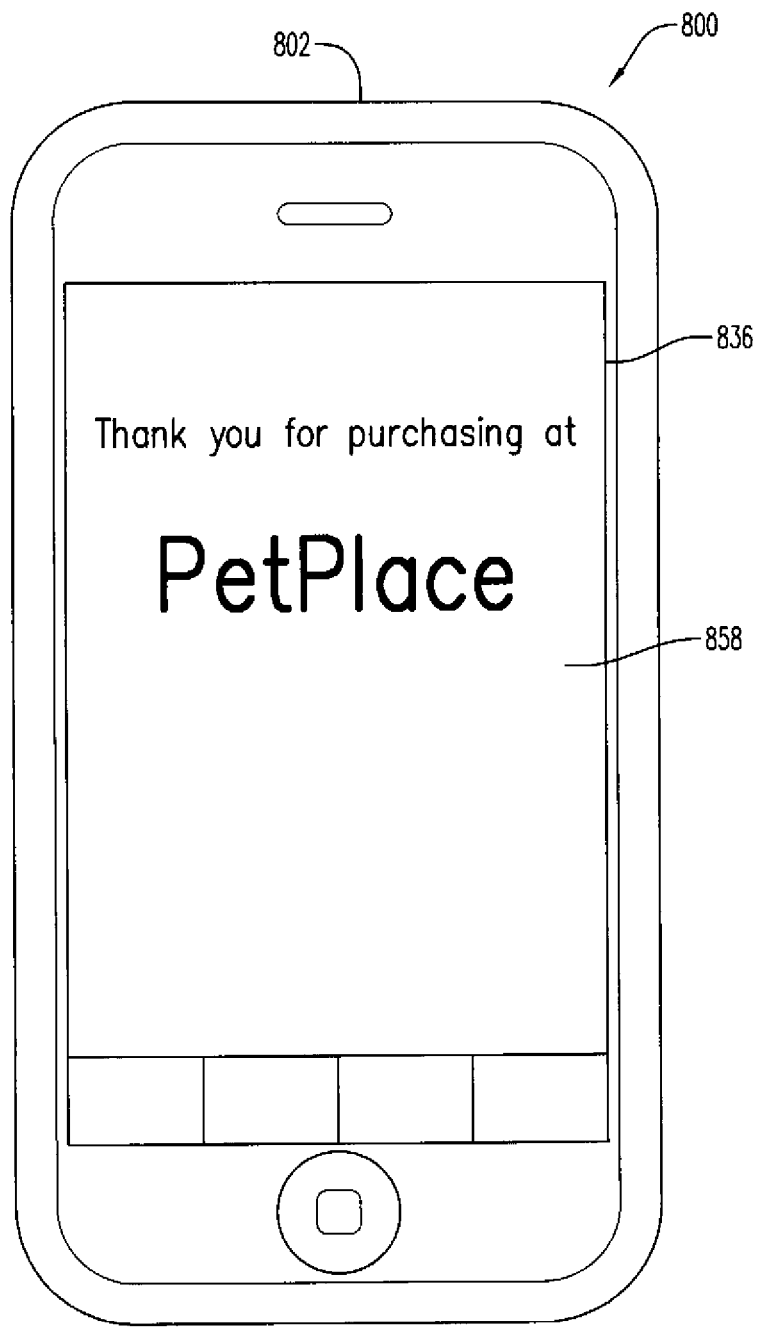

Referring now to FIG. 8D, a further user interface is shown, again on a display device 836 of a mobile device 802. In the user interface of FIG. 8D, the customer has confirmed the purchase (e.g., by selecting "Confirm" 848 on FIG. 8C or by tapping on one of the payment accounts 844a-n in FIG. 8B, or by having specified a default payment instrument to use for all transactions after capturing the checkout token as shown in FIG. 8A), and the payment message has been transmitted to the transaction management system. The user interface of FIG. 8D shows the customer the details 850 of the just-completed transaction including any loyalty rewards, rebate amount or the like earned from the transaction (shown at 854 as a savings amount). The user interface also shows a region 856 where coupons, advertisements, or other offers sourced from advertising and offer management networks via the Ads and Offers management system (such as the system 638 of FIG. 6) may be presented to the customer. Once the customer is done viewing the transaction details, the customer may click on a button 852 to navigate away from the screen and to return to the home page of the payment application or to a thank you page such as the page 858 shown in the user interface of FIG. 8E.

Those skilled in the art will appreciate that other user interfaces, messages and screens may be used to present payment options, transaction information and other details to a user of a mobile payment application pursuant to the present invention.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims. For example, transactions using the present invention may extend to situations where a customer needs to add a tip or other service fee after an original transaction total has been tallied, such as, for example, when paying a bill at a restaurant, or when paying for a taxi fare. In such situations, the amount due is optional, as the buyer may wish to add a tip after the transaction is initiated. In other situations, such as taxi cabs, the taxi may just have displayed a sticker with a barcode (where the barcode is a static checkout token), and capturing the sticker will link the buyer's payment account to the receipt printer in the taxi once payment has been authorized.

In some embodiments, the system of the present invention can be used to initiate and conduct "decoupled debit" types of transactions that: (i) do not require a physical plastic card with a magnetic stripe to initiate a debit against a checking account at the point of sale, (ii) do not require a magnetic stripe reader to initiate a debit against a checking account at the point of sale, (iii) do not require the use of the standard point of sale transaction routing networks—VISA, MC, Discover, etc. to route transactions to the Federal Reserve's ACH network. A number of advantages are provided, for example, (i) lower transaction costs for merchants—by bypassing the card swipe terminal at the POS and the associated payment transport networks—VISA/MC/Discover, etc.—embodiments are able to remove significant costs from the system, (ii) improved convenience for customers—the mobile form factor means the payment instrument is always close at hand.

In some embodiments, merchants are provided with a new way to accept checking account payments at a physical point of sale without requiring the customer to physically present a check to the merchant. Today, NACHA rules specify how check payments may be originated at the point of sale, including specifying "origination codes" that specify the type of the ACH transaction. Today, the only way that a merchant can take in an electronic check from a customer at a physical in store point of sale is to either: (i) capture a scanned image of the check via a check21 scanner, or (ii) follow a NACHA defined process to create an ACH transaction with an origination code of POP, which stands for Point of Purchase Check Conversion. Embodiments allow transactions to be conducted at the point of sale using the NACHA WEB transaction type.

In some embodiments, a POS to payment authorization device token capturing system is provided that is token delivery mechanism agnostic. For example, the mobile device works with both near field communication or barcode or multi-dimensional barcode recognition techniques to link a transaction initiated at the POS with a corresponding authorization message sent by the customer from their mobile device to authorize the transaction. In some embodiments, systems of the present invention provide customer initiated delivery of both payment and loyalty credentials to online and/or physical POS using a mobile device. For example, during processing of a transaction, both loyalty and payment account information associated with the customer may be retrieved and presented to the customer during a transaction (and, in some embodiments, the loyalty account may be automatically applied to all transactions at a participating merchant) allowing ready and efficient insertion of loyalty and payment information in a single transaction.

The invention claimed is:

1. A transaction management system for use in completing a payment transaction between a customer operating a mobile device and a merchant, the transaction management system comprising:
   a communication port;
   a non-transitory memory; and
   one or more hardware processors coupled to the non-transitory memory and configured to read instructions from the non-transitory memory to cause the system to perform operations comprising:
      receiving a message to initiate transaction processing sent from a point of sale device associated with the merchant,
      generating pending transaction data associated with the transaction,
      generating a checkout token,
      communicating the checkout token to the point of sale device and/or the mobile device,
      receiving, from the merchant, a merchant payment authorization request,
      deteimining, from the merchant payment authorization request, information associated with the checkout token and information identifying at least one of the merchant and/or a point of sale device,
      receiving, from the mobile device, a customer transaction lookup request,
      determining, from the customer transaction lookup request, information associated with the checkout token and information identifying the customer,
      updating the pending transaction data with information identifying the merchant and/or the point of sale device, the customer, and at least one account of the customer,
      causing a request message to be generated to request an authorization of the transaction, the request message comprising the updated transaction information including information identifying the merchant and/or the point of sale device, the customer, and the at least one account of the customer, and
      communicating the request message to request an authorization of the transaction.

2. The transaction management system of claim 1, wherein the instructions from the non-transitory memory are further configured to cause the system to perform operations comprising:
   matching information from the checkout token to information associated with the merchant payment authorization request; and
   identifying at least one available customer payment account for use in the payment transaction.

3. The transaction management system of claim 2, wherein the instructions from the non-transitory memory are further configured to cause the system to perform operations comprising:
   transmitting, to the mobile device, information associated with the merchant payment authorization request and/or information identifying the at least one available customer payment account;
   receiving, from the mobile device, a customer payment authorization request;
   transmitting the request message to obtain an authorization of the payment transaction, wherein the request message comprises information based on the customer payment authorization request and associated with the authorization of the payment transaction.

4. The transaction management system of claim 3, wherein the instructions from the non-transitory memory are further configured to cause the system to perform operations comprising:
receiving an authorization response message responsive to the request message;
transmitting at least a transaction completion message to the mobile device and/or the point of sale device.

5. The transaction management system of claim 3, wherein a plurality of available customer payment accounts are identified for use in the payment transaction, the information associated with the merchant payment authorization request identifies the plurality of available customer payment accounts, and the customer payment authorization request further includes information identifying at least one payment account selected from the set of available customer payment accounts.

6. The transaction management system of claim 1, wherein the instructions from the non-transitory memory are further configured to cause the system to perform operations comprising:
receiving a customer authentication request from the mobile device; and
authenticating at least one of the customer and/or the mobile device.

7. The transaction management system of claim 1, wherein the checkout token comprises information indicating at least one of a transaction amount, an identifier of the merchant, a transaction identifier, a time stamp, and an identifier of the point of sale device.

8. The transaction management system of claim 1, wherein the information associated with the checkout token included in the customer transaction lookup request is based on information obtained from the merchant and/or the point of sale device.

9. The transaction management system of claim 1, wherein the information associated with the checkout token included in the merchant payment authorization request is based on information obtained from the mobile device.

10. The transaction management system of claim 1, wherein the instructions from the non-transitory memory are further configured to cause the system to perform operations comprising:
receiving an authorization response message;
transmitting a transaction completion message to the mobile device; and
transmitting a transaction completion message to the point of sale device and/or the merchant.

11. The transaction management system of claim 1, wherein the checkout token is one of a static token and a dynamic token.

12. A point of sale device associated with a merchant for use in completing a payment transaction between a customer and a merchant, the point of sale device comprising:
a communication port;
a non-transitory memory; and
one or more hardware processors coupled to the non-transitory memory and configured to read instructions from the non-transitory memory to cause the system to perform operations comprising:
transmitting a message to initiate transaction processing to a transaction management system,
receiving a checkout token generated by the transaction management system from at least one of the transaction management system and/or a mobile device associated with the customer,
generating, responsive to receiving the checkout token, a merchant payment authorization request comprising information associated with the checkout token and information identifying at least one of the merchant and/or the point of sale device, and
transmitting the merchant payment authorization request to the transaction management system, wherein the merchant payment authorization request is configured to be processed by the transaction management system such that:
responsive to receiving the merchant payment authorization request and a customer transaction look request comprising information associated with the checkout token and information identifying the customer, update pending transaction data generated by the transaction management system with information identifying the merchant and/or the point of sale device, the customer, and at least one account of the customer; and
responsive to receiving the merchant payment authorization request and updating the pending transaction data, cause a request message to be generated and communicated to request an authorization of the transaction, the request message comprising the updated transaction information including information identifying the merchant and/or the point of sale device, the customer, and the at least one account of the customer.

13. The point of sale device of claim 12, wherein receiving the checkout token comprises receiving the checkout token from the transaction management system and the instructions from the non-transitory memory are further configured to cause the system to perform operations comprising:
presenting the checkout token to the mobile device for capture, wherein, the checkout token is configured to be transmitted from the mobile device to the transaction management system to cause the transaction management system to identify a list of available accounts associated with the customer for selection.

14. The point of sale device of claim 13, wherein the instructions from the non-transitory memory are further configured to cause the system to perform operations comprising:
receiving a payment authorization message transmitted from the transaction management system, wherein the payment authorization message is received responsive to presenting the checkout token to the mobile device; and
completing the payment transaction.

15. The point of sale device of claim 12, wherein receiving the checkout token comprises receiving the checkout token from the mobile device.

16. A method for operating a system to complete a payment transaction between a customer operating a mobile device and a merchant, the method comprising:
receiving a message to initiate transaction processing sent from a point of sale device associated with the merchant;
generating pending transaction data associated with the transaction;
generating a checkout token;
communicating the checkout token to the point of sale device and/or the mobile device,
receiving, from the merchant, a merchant payment authorization request;

determining, from the merchant payment authorization request, information associated with the checkout token and information identifying at least one of the merchant and/or the point of sale device;
receiving, from the mobile device, a customer transaction lookup request;
determining, from the customer transaction lookup request, information associated with the checkout token and information identifying the customer,
updating the pending transaction data to create updated transaction data comprising information identifying the merchant and/or the point of sale device, the customer, and at least one account of the customer;
causing a request message to be generated to request an authorization of the transaction, the request message comprising the updated transaction information including information identifying the merchant and/or the point of sale device, the customer, and the at least one account of the customer; and
communicating the request message to request an authorization of the transaction.

17. The method of claim 16, further comprising:
matching information from the checkout token to information associated with the merchant payment authorization request; and
identifying at least one available customer payment account for use in the payment transaction.

18. The method of claim 17, further comprising:
transmitting, to the mobile device, information associated with the merchant payment authorization request and/or information identifying the at least one available customer payment account;
receiving, from the mobile device, a customer payment authorization request;
transmitting the request message to obtain an authorization of the payment transaction, wherein the request message comprises information based on the customer payment authorization request and associated with the authorization of the payment transaction.

19. The method of claim 18, further comprising:
receiving an authorization response message responsive to the request message;
transmitting at least a transaction completion message to the mobile device and/or the point of sale device.

20. The method of claim 18, wherein a plurality of available customer payment accounts are identified for use in the payment transaction, the information associated with the merchant payment authorization request identifies the plurality of available customer payment accounts, and the customer payment authorization request further includes information identifying at least one payment account selected from the set of available customer payment accounts.

21. The method of claim 16, further comprising:
receiving a customer authentication request from the mobile device and authenticating at least one of the customer and/or the mobile device.

22. The method of claim 16, wherein the checkout token comprises information indicating at least one of a transaction amount, an identifier of the merchant, a transaction identifier, a time stamp, and an identifier of the point of sale device.

23. The method of claim 16, wherein the information associated with the checkout token included in the customer transaction lookup request is based on information obtained from the merchant and/or the point of sale device.

24. The method of claim 16, wherein the information associated with the checkout token included in the merchant payment authorization request is based on information obtained from the mobile device.

25. The method of claim 16, further comprising:
receiving an authorization response message;
transmitting a transaction completion message to the mobile device; and
transmitting a transaction completion message to the point of sale device and/or the merchant.

26. The method of claim 16, wherein the checkout token is one of a static token and a dynamic token.

27. A method for operating a point of sale device associated with a merchant for use in completing a payment transaction between a customer and the merchant, the method comprising:
transmitting a message to initiate transaction processing to a transaction management system;
receiving a checkout token generated by the transaction management system from at least one of the transaction management system and/or a mobile device associated with the customer;
generating, responsive to receiving the checkout token, a merchant payment authorization request comprising information associated with the checkout token and information identifying at least one of the merchant associated and/or the point of sale device; and
transmitting the merchant payment authorization request to the transaction management system, wherein the merchant payment authorization request is configured to be processed by the transaction management system such that:
responsive to receiving the merchant payment authorization request and a customer transaction look request comprising information associated with the checkout token and information identifying the customer, update pending transaction data generated by the transaction management system with information identifying the merchant and/or the point of sale device, the customer, and at least one account of the customer, and
responsive to receiving the merchant payment authorization request and updating the pending transaction data, cause a request message to be generated and communicated to request an authorization of the transaction, the request message comprising the updated transaction information including information identifying the merchant and/or the point of sale device, the customer, and the at least one account of the customer.

28. The method of claim 27, wherein receiving the checkout token comprises receiving the checkout token from the transaction management system and the method further comprises:
presenting the checkout token to the mobile device for capture, wherein, the checkout token is configured to be transmitted from the mobile device to the transaction management system to cause the transaction management system to identify a list of available accounts associated with the customer for selection.

29. The method of claim 28, wherein the method further comprises:
receiving a payment authorization message transmitted from the transaction management system, wherein the payment authorization message is presenting the checkout token to the mobile device; and
completing said payment transaction.

30. The method of claim 27, wherein receiving the checkout token comprises receiving the checkout token from the mobile device.

\* \* \* \* \*